United States Patent
Akula et al.

(10) Patent No.: US 12,393,928 B2
(45) Date of Patent: Aug. 19, 2025

(54) DIGITAL WALLET FOR HEALTHCARE EXPENSES

(71) Applicant: Optum, Inc., Minnetonka, MN (US)

(72) Inventors: Srilekha Akula, Fremont, CA (US);
Steven Martin, Minnetonka, MN (US);
J. Gregory Stout, San Jose, CA (US)

(*) Notice: Subject to any disclaimer, the term of this patent is extended or adjusted under 35 U.S.C. 154(b) by 0 days.

(21) Appl. No.: 18/337,791

(22) Filed: Jun. 20, 2023

(65) Prior Publication Data

US 2024/0428232 A1 Dec. 26, 2024

(51) Int. Cl.
*G06Q 20/36* (2012.01)
*G06Q 20/10* (2012.01)
*G06Q 20/40* (2012.01)
*G06Q 40/08* (2012.01)
*G06Q 40/06* (2012.01)

(52) U.S. Cl.
CPC .......... *G06Q 20/3674* (2013.01); *G06Q 20/10* (2013.01); *G06Q 20/405* (2013.01); *G06Q 40/08* (2013.01); *G06Q 40/06* (2013.01)

(58) Field of Classification Search
None
See application file for complete search history.

(56) References Cited

U.S. PATENT DOCUMENTS

| 8,805,725 | B2 | 8/2014 | Calman | |
| 2013/0339165 | A1* | 12/2013 | Calman | G06Q 20/405 705/16 |
| 2017/0011390 | A1* | 1/2017 | Hsieh | G06Q 20/36 |
| 2019/0325527 | A1* | 10/2019 | Bhavsar | G06Q 40/10 |

\* cited by examiner

*Primary Examiner* — Matthew S Gart
*Assistant Examiner* — Liz P Nguyen
(74) *Attorney, Agent, or Firm* — MARSHALL, GERSTEIN & BORUN LLP

(57) ABSTRACT

A system and related methods for a digital wallet are disclosed. The method includes: establishing a connection between external fund sources and a digital wallet account to facilitate electronic fund transfers, the external funding sources including an external fund source that is directly associated with a primary owner of the digital wallet account and an external fund source that is associated with an entity other than the primary owner; obtaining a set of rules that dictate how funds are disbursed from the external fund sources funds, including a rule defined by the primary owner of the digital wallet system and a rule defined by each of the plurality of external fund sources; receiving a first electronic payment request; identifying an external fund source or sources by evaluating the first electronic payment request with respect to the first set of rules; and disbursing funds to satisfy the first electronic payment request.

20 Claims, 8 Drawing Sheets

FIG. 9

DIGITAL WALLET FOR HEALTHCARE EXPENSES

BACKGROUND

Digital wallet systems are software applications or online platforms that allow users to store their digital assets, make payments, and perform various financial transactions electronically. Conventional digital wallet systems allow users to associate various cards—such as cash cards, credit cards, non-monetary cards (e.g., loyalty cards, boarding passes, etc.), and the like—with a digital user account, such that the user can access digital representations of their cards for providing payments and other activities without carrying the physical card. However, most digital wallet solutions generally do not allow multiple users to access or contribute funds to a single account (e.g., most digital wallet solutions are tied to a single identity) and are detached from disbursements. For example, many digital wallet systems simply disburse funds from a user-selected source (e.g., a credit card) without providing feedback.

Healthcare expenses are often paid using one or more of a health savings account (HSA) or flexible spending account (FSA), credit or debit cards, cash, or a payment plan (e.g., facilitated by a healthcare provider). Generally, HSAs and FSAs—along with certain other types of accounts, such as charity accounts—are limited to qualifying medical expenses. In addition, some funding sources (e.g., provider payment plans) have limitations that are not applicable to the types of transactions typically facilitated by traditional digital wallets. Thus, current digital wallet solutions are not suitable for the uniqueness associated with healthcare expense payments, e.g., with respect to qualified expenses.

SUMMARY

One implementation of the present disclosure is a system including: one or more processors; and memory having instructions stored thereon that, when executed by the one or more processors, cause the system to: establish a connection between a plurality of external fund sources and a digital wallet account to facilitate electronic fund transfers from each of the plurality of external fund sources, wherein the plurality of external funding sources includes: i) at least one external fund source that is directly associated with a primary owner of the digital wallet account, and ii) at least one external fund source that is associated with an entity other than the primary owner of the digital wallet account; obtain a first set of rules that dictate how funds are disbursed from the plurality of external fund sources funds to satisfy electronic payment requests, wherein the first set of rules includes: i) at least one rule defined by the primary owner of the digital wallet system, ii) at least one rule defined by each of the plurality of external fund sources; receive a first electronic payment request; identify at least one of the plurality of external fund sources from which to source funds to satisfy the first electronic payment request by evaluating the first electronic payment request with respect to the first set of rules; and disburse funds from the identified at least one of the plurality of external fund sources to satisfy the first electronic payment request.

Another implementation of the present disclosure is a method including: establishing, by a computing device, a connection between a plurality of external fund sources and a digital wallet account to facilitate electronic fund transfers from each of the plurality of external fund sources, wherein the plurality of external funding sources includes: i) at least one external fund source that is directly associated with a primary owner of the digital wallet account, and ii) at least one external fund source that is associated with an entity other than the primary owner of the digital wallet account; obtaining, by the computing device, a first set of rules that dictate how funds are disbursed from the plurality of external fund sources funds to satisfy electronic payment requests, wherein the first set of rules includes: i) at least one rule defined by the primary owner of the digital wallet account, ii) at least one rule defined by each of the plurality of external fund sources; receiving, by the computing device, a first electronic payment request; identifying, by the computing device, at least one of the plurality of external fund sources from which to source funds to satisfy the first electronic payment request by evaluating the first electronic payment request with respect to the first set of rules; and disbursing, by the computing device, funds from the identified at least one of the plurality of external fund sources to satisfy the first electronic payment request.

Yet another implementation of the present disclosure is a non-transitory computer readable medium having instructions stored thereon that, when executed by one or more processors of a computing device, cause the computing device to: establish a connection between a plurality of external fund sources and a digital wallet account to facilitate electronic fund transfers from each of the plurality of external fund sources, wherein the plurality of external funding sources includes: i) at least one external fund source that is directly associated with a primary owner of the digital wallet account, and ii) at least one external fund source that is associated with an entity other than the primary owner of the digital wallet account; obtain a first set of rules that dictate how funds are disbursed from the plurality of external fund sources funds to satisfy electronic payment requests, wherein the first set of rules includes: i) at least one rule defined by the primary owner of the digital wallet account, ii) at least one rule defined by each of the plurality of external fund sources; receive a first electronic payment request; identify at least one of the plurality of external fund sources from which to source funds to satisfy the first electronic payment request by evaluating the first electronic payment request with respect to the first set of rules; and disburse funds from the identified at least one of the plurality of external fund sources to satisfy the first electronic payment request.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIGS. 7-9 are example user interfaces for a digital wallet system, according to some implementations.

Figure 1:
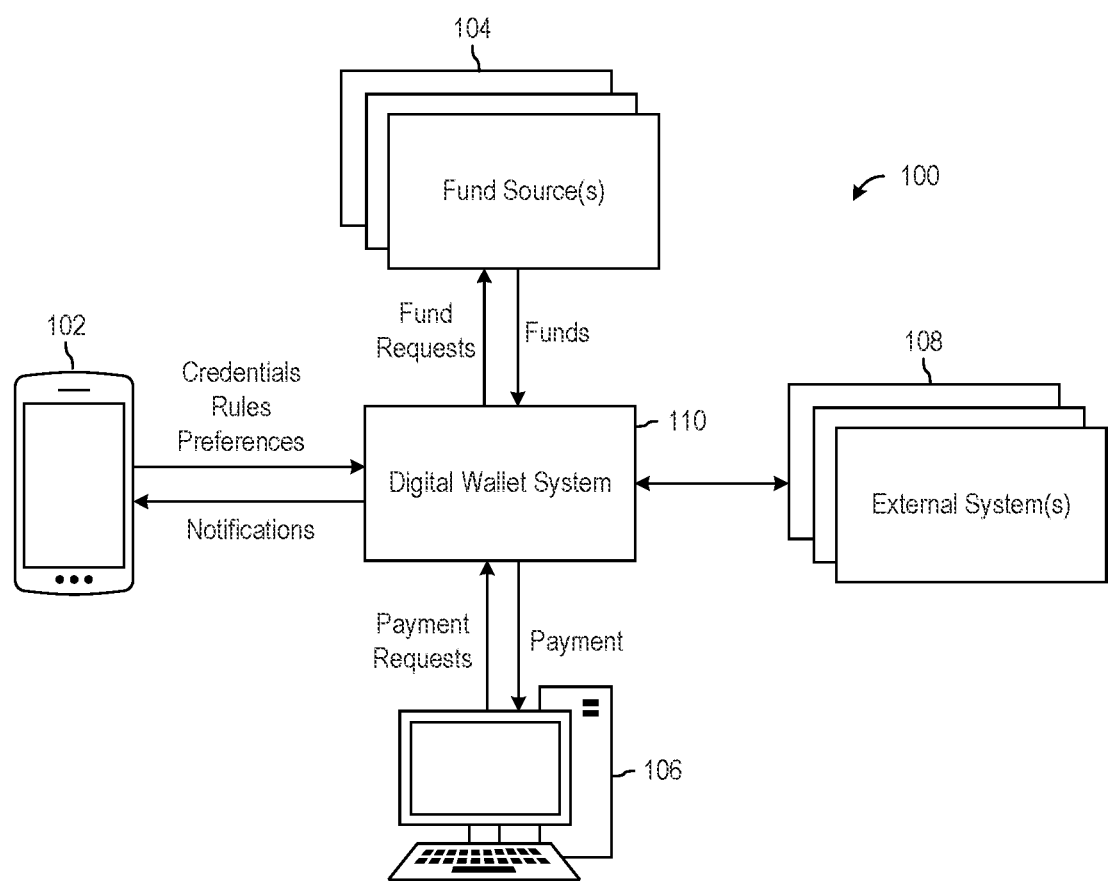
FIG. 1 is a block diagram of an example communication topology for managing healthcare expenses via a digital wallet, according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a digital wallet system and associated methods for managing healthcare expenses are shown, according to various implementations. In particular, the disclosed digital wallet system and methods are designed to facilitate the management and payment of healthcare expenses (e.g., including on-demand provisioning, investment, and disbursement) through a multi-source/multi-contributor digital wallet with configurable options for authentication, authorization, alerting, usage, applicable rules, and notifications. Unlike existing digital wallets, the disclosed digital wallet system is generally aware of and/or informed by disbursements to allow for multiple fund sources (e.g., HSA/FSA accounts, credit/debit cards, etc.) and/or contributors (e.g., guarantors, trustees, power of attorney, etc.). To this point, the disclosed digital wallet system can intelligently determine how to procure and disburse funds when a payment request is received by evaluating the payment request against predefined rules and user preferences. For example, the disclosed digital wallet system can identify qualified healthcare expenses that can be paid via an HSA or FSA and can disburse funds from appropriate fund sources. In some implementations, the disclosed digital wallet system can disburse funds from multiple fund sources even for a single payment request.

As described in greater detail below, the disclosed digital wallet system is generally configured to procure funds from any number of external sources, including sources that are not directly owned or associated with a primary owner/user of the digital wallet. Thus, the digital wallet system allows for fund sources to be "detached" from the primary owner/user. For example, family members or caregivers, government entities, charities, and the like can all contribute funds to a privately held digital wallet to facilitate the payment of healthcare expenses. In addition, the disclosed digital wallet system can allow multiple users to access a common holding account. In some implementations, the disclosed digital wallet system can automatically and intelligently invest funds, e.g., maintained in a holding account. Further, the disclosed digital wallet system can process reimbursement requests, e.g., for payments made outside of the digital wallet, which is not a feature found in currently available digital wallets. Additional features of the disclosed digital wallet system are described below.

Overview

Referring to FIG. 1, a block diagram of an example communication topology 100 for managing healthcare expenses via a digital wallet system 110 is shown, according to some implementations. In this example, digital wallet system 110 is shown to be communicably coupled to a plurality of remote devices and systems, including a user device 102, a plurality of fund sources 104, a requesting device 106, and a variety of external system(s) 108. Generally, each of user device 102, fund sources 104, requesting device 106, or external systems 108 are communicably coupled to digital wallet system 110 via a network, such as a local area network (LAN), a virtual private network (VPN), or the Internet (e.g., a wide area network (WAN)). For example, as described below, digital wallet system 110 may be hosted on a cloud server or other remote computing device and can therefore be accessed via the Internet. However, it should be appreciated that the various components shown in communication topology 100 can be communicably coupled by any other suitable means (e.g., any direct or indirect communication method).

User device 102, as described herein, may be any computing device that is operable by a user to access digital wallet system 110. Accordingly, while not explicitly shown, it should be understood that user device 102 typically includes one or more processors, memory, and user interface components. As an example, user device 102 can be a laptop or desktop computer, a server, a smartphone, a smartwatch, a tablet, or the like. In the example shown, user device 102 may be a smartphone that includes a touchscreen interface for presenting data and receiving user inputs; however, the present disclosure is not intended to be limited in this regard. Likewise, requesting device 106 may be any computing device that is operable by a user to send payment requests and/or receive payments (e.g., funds) from digital wallet system 110. While not explicitly shown, it should be understood that requesting device 106 also typically includes one or more processors, memory, and user interface components. As an example, requesting device 106 can be a laptop or desktop computer, a server, a smartphone, a smartwatch, a tablet, payment terminal, or the like. In the example shown, requesting device 106 is illustrated as a desktop computer; however, the present disclosure is not intended to be limited in this regard.

Fund sources 104 can generally include any number of sources from which funds can be procured by digital wallet system 110, e.g., to satisfy payment requests. As described in greater detail below with respect to FIG. 2, for example, fund sources 104 can include one or more health savings accounts (HSAs), flexible spending accounts (FSAs), bank accounts (e.g., trust accounts), credit/debit cards, charity accounts (e.g., crowd-fund accounts), and the like. In some implementations, each of fund sources 104 is hosted by or maintained on a different computing device or system; however, in some implementations, one or more of fund sources 104 can be hosted by or maintained on a common computing device or system. For example, fund sources 104 may include both an HSA and a bank account, each hosted by or maintained on a separate computing system (e.g., associated with separate financial institutions) or hosted by or maintained on the same computing system (e.g., associated with the same financial institution).

External system(s) 108 can include any number of additional computing systems, devices, or services, as described in greater detail below. In some implementations, external system(s) 108 includes a computer system or service for investing funds maintained by digital wallet system 110. For example, digital wallet system 110 can procure funds from fund sources 104 and can invest at least a portion of the funds via external investment services/systems. Accordingly, digital wallet system 110 may be able to electronically transfer funds to and/or receive funds from one or more of external system(s) 108. In some implementations, external system(s) 108 includes a healthcare provider computing system, which is any computing system or device operated by a healthcare provider (e.g., a healthcare or hospital group, a physician, etc.). Likewise, in some implementations, external system(s) 108 includes a healthcare payor computing system, which is any computing system or device operated by a healthcare payor (e.g., an insurance company, Medicare/Medicaid, etc.).

As described briefly above, digital wallet system 110 is generally configured to procure and/or manage funds from a plurality of sources (e.g., fund sources 104) and can intelligently disburse funds to satisfy healthcare-related payment requests (e.g., received from requesting device 106). In some implementations, digital wallet system 110 is configured to maintain a number of rule sets and/or user preferences dictating the procurement and/or disbursement of funds. In some implementations, digital wallet system 110 maintains at least one rule set for procuring funds and at least one rule set for disbursing funds, as described in greater detail below. When a payment request is received, e.g., from requesting device 106, digital wallet system 110 may evaluate the payment request to determine which of fund sources 104 to obtain/source funds from for satisfying the request. In some implementations, digital wallet system 110 evaluates the payment request based on the rule sets and/or user preferences but can also make decisions where an explicit rule or preference is not established. For example, digital wallet system 110 can include an artificial intelligence (AI) model that determines how to disburse funds after considering any rules and/or user preferences.

In some implementations, digital wallet system 110 is configured to identify medical expenses that are eligible to be paid by an HSA, FSA, or another similar account, e.g., that includes restrictions on the type of products or services that the associated funds can be used to pay for. For example, digital wallet system 110 may communicate (e.g., transmit data to and/or receive data from) a health insurance provider (e.g., an employer self-pay plan, Medicare or Medicaid, a health insurance company, a combination of multiple plans, etc.) associated with a beneficiary of the digital wallet to determine whether each item in a payment request is a qualifying or non-qualifying medical expense. In some implementations, digital wallet system 110 can maintain multiple HSA cards from a single user (e.g., a primary owner of the account) or from multiple users that each contribute to the digital wallet. For example, a child may be covered by health insurance plans associated with both of their parents. In some such implementations, digital wallet system 110 can check for eligibility while adding a fund source (e.g., an HSA or FSA card) to the wallet (e.g., a static one-time check) and/or while paying for a qualified medical expense (e.g., a dynamic disbursement). In some implementations, digital wallet system 110 can verify the qualification of an expense by communicating with (e.g., sending a request to) a healthcare provider, a healthcare payor, or both.

In some implementations, digital wallet system 110 allows users or authorized parties to associate a priority to fund sources 104, e.g., for satisfying a payment request. For example, a primary user could dictate that digital wallet system 110 disburse funds first from an HSA card, then from a credit card, and then from an individual bank account, to satisfy payment requests that include qualifying medical expenses. In some implementations, digital wallet system 110 allows users to group fund sources 104, associate prioritization to each group, and/or set limits to fund sources 104 or group. For example, a user could dictate that "Fund A" only be used to pay for a certain percentage of a payment request or that "Fund B" can only provide a certain dollar amount in funds (e.g., a $100 limit). In some implementations, each "group" can contain one or more of fund sources 104. In some implementations, if an explicit grouping or prioritization is not set, digital wallet system 110 can intelligently determine a prioritization (e.g., HSA first, then credit cards in the order they were added to the digital wallet; once each credit card reaches their limit minus a set dollar amount, use funds from a bank account). In some implementations, digital wallet system 110 may facilitate a payment plan by partnering with another vendor (e.g., a third-party payment service).

For added clarity, consider the following example use-case of communication topology 100, as illustrated in FIG. 1. Initially, a user—herein referred to as the "primary account owner" or "primary user"—creates a digital wallet account hosted by digital wallet system 110. For example, the primary account owner may use user device 102 to navigate to a webpage, application, or another interface for interacting with digital wallet system 110, and may register for an account by providing an email address, setting a password, providing identifying information (e.g., a name, a phone number, an address, etc.) In some cases, the primary account owner may establish a digital wallet account for themselves, e.g., by providing their own information. In other cases, the primary account owner can establish a digital wallet account for another person, e.g., by providing information associated with the other person. For example, the primary account owner could be a parent that is establishing a digital wallet on behalf of their child. Thus, it should be understood that the beneficiary of a digital wallet implemented via digital wallet system 110 is not necessarily the primary account owner.

During or after the digital wallet account creation process, the primary account owner may "add" one or more fund sources (e.g., fund sources 104) to the digital wallet. Generally, "adding" a fund source refers to connecting the fund source to the digital wallet to facilitate electronic fund transfers from the fund source to the digital wallet or to another recipient (e.g., facilitated by the digital wallet). For example, the digital wallet and the fund source may be connected through associated application programming interfaces (APIs) to facilitate communications and/or fund transfers. In some implementations, a fund source is connected to the digital wallet by providing digital wallet system 110 with security credentials to access the fund source. For example, to connect a bank account to digital wallet system 110, a user may enter a username, email, or other identifier and a password that they normally use to access their bank account remotely (e.g., via a web browser). In some implementations, a fund source is added by entering details of the fund source itself into digital wallet system 110. For example, when adding an HSA or FSA card to digital wallet system 110, a user may enter a card number, expiration date, security code (e.g., card verification value (CVV)), and/or other details of the card. Additional details related to adding fund sources to digital wallet system 110 are provided below.

In addition to connecting fund sources 104 to digital wallet system 110, the primary account owner may establish rules and/or preferences for procuring and disbursing funds. In some implementations, the primary account owner provides rules and/or preferences via user device 102, e.g., when creating or after creating a digital wallet account. For example, the primary account owner may establish priority rules that dictate an order in which funds are procured and/or disbursed from fund sources 104. As another example, the primary account owner may establish limits on the amount of funds (e.g., a dollar amount) that can be sourced from any given one of fund sources 104. In some implementations, in addition to or in lieu of the primary account owner establishing rules/preferences, one or more of fund sources 104 can provide their own procurement and/or disbursement rules. For example, when adding an HSA to digital wallet system 110, the HSA's host computing system may provide digital wallet system 110 with a set of rules that dictate the types of goods or services that can be paid for using HSA funds (e.g., qualifying medical expenses). Additional procurement and disbursement rules/preferences are discussed in detail below with respect to FIG. 2.

In some implementations, one or more secondary authorized account users can be provided with access to a digital wallet account. Generally, a secondary authorized account user is any user of digital wallet system 110 that is not the primary account owner for a specific digital wallet. In some such implementations, secondary authorized account users can be added to a digital wallet account by the primary account owner, e.g., during or after account creation. With respect to a digital wallet for a child, for example, a parent (e.g., the primary account owner) could add a spouse, a grandparent, or another caretaker as a secondary authorized account user to allow the spouse/grandparent/caretaker to add funds, make payments, and the like. Additionally, or alternatively, secondary users could "apply" to access a digital wallet, in which case the primary account owner could maintain control over approving/denying requests. In some implementations, secondary authorized account users are required to create their own account for accessing a specific digital wallet account, e.g., which includes unique login credentials. In this manner, the functionality of secondary authorized account user accounts could be limited. For example, secondary authorized account users may have limited access to remove fund sources 104, make payments, etc., without approval from the primary account owner.

Once a digital wallet account is created, fund sources (e.g., fund sources 104) are connected, and procurement and disbursement rules are established, the digital wallet account can be used to satisfy payment requests, e.g., received from requesting device 106. A "payment request," as described herein, generally refers to any electronic request for payment, such as a charge against an account, an electronic bill, or the like. However, in the context of communication topology 100, payment requests generally include at least one healthcare-related expense. In some implementations, digital wallet system 110 is configured to receive payment requests in the form of electronic healthcare claims (e.g., an EDI 837 file). For example, requesting device 106 (e.g., a computing device operated by a healthcare provider or medical billing specialist) may transmit an electronic healthcare claim to digital wallet system 110 for payment. Generally, an electronic healthcare claim includes various diagnosis and/or procedure codes, which can be evaluated by digital wallet system 110 to identify qualifying medical expenses, for example. Unlike traditional digital wallet systems, digital wallet system 110 may also be able to process reimbursement requests (e.g., as a payment request). For example, a primary account owner could submit a reimbursement request for medical expenses paid out-of-pocket.

Upon receipt, digital wallet system 110 is generally configured to evaluate electronic payment requests to determine how to disburse funds. In some implementations, digital wallet system 110 evaluates the electronic payment request against the rules and/or preferences defined by the primary account owner, any secondary authorized account users, and/or fund sources 104. Digital wallet system 110 can then intelligently determine which of fund sources 104 to source funds from for satisfying the payment request. As mentioned above, in some implementations, digital wallet system 110 includes an AI model for evaluating payment requests. In some such implementations, the AI model may be trained based on the rules and/or preferences defined by the primary account owner, any secondary authorized account users, and/or fund sources 104. In some implementations, digital wallet system 110 can obtain funds from fund sources 104 for disbursement based on the evaluation of the payment request. In some such implementations, digital wallet system 110 can facilitate the transfer of funds directly from one or more of fund sources 104 to requesting device 106 or another recipient (e.g., a bank account). In some implementations, digital wallet system 110 can retain funds in a local or remote holding account, from which the funds are disbursed. For example, digital wallet system 110 can procure funds from fund sources 104 even before a payment request is received such that funds can be disbursed from the holding account as needed. As described in greater detail below, retaining funds in a holding account can allow digital wallet system 110 to automatically invest funds, in some cases.

Whether funds are maintained in a holding account or retained by fund sources 104, or both, digital wallet system 110 may be configured to facilitate the transfer of funds to requesting device 106. For example, digital wallet system 110 may transfer funds from a holding account to requesting device 106 or may command a separate system (e.g., a bank computer system) to transfer funds from the holding account. In another example, digital wallet system 110 may facilitate the transfer of funds directly from fund sources 104 to requesting device 106. In some implementations, if a payment request meets a notification or alert criteria, digital wallet system 110 is configured to transmit a notification to user device 102. For example, if a payment request exceeds a threshold amount (e.g., $500), digital wallet system 110 may generate and transmit, to user device 102, an alert that notifies the user. In some implementations, digital wallet system 110 can transmit notifications to user device 102 that prompt a user for approval before transferring funds.

As described herein, digital wallet system 110 can also be used to "pre-check" expenses to determine if a digital wallet account can be used to pay for the expense (e.g., based on fund sources 104 that are connected to the digital wallet account) and/or to predict how funds may be apportioned from fund sources 104. This would allow the digital wallet users (e.g., the primary account owner and/or secondary authorized account users) to determine (e.g., before the transaction) if the specific transaction will be covered by fund sources 104 associated with their digital wallet account. Further, in some implementations, digital wallet system 110 can predict how funds would be apportioned for the expense/transaction (e.g., 20% from HSA, 70% from charity fund, 10% cash) based on the funds currently available. In some implementations, this sort of "pre-check" for an expense or transaction is initiated by a user, who enters details of an upcoming or expected expense (e.g., a visit with a healthcare provider, a payment for a prescription, etc.) into a user interface for digital wallet system 110 or by another manner. For example, a digital wallet account's primary owner may enter details of an upcoming healthcare provider visit (e.g., a reason for the visit, provider details, health insurance information, etc.) to perform a pre-check of whether the healthcare provider visit is covered and how funds are predicted to be apportioned from fund sources 104 to satisfy the predicted payment for the healthcare provider visit. In some implementations, pre-checks can be initiated by an external entity, e.g., to determine if the digital wallet account has sufficient funds to satisfy a future payment request. For example, a healthcare provider could submit details of a future payment request for a pre-check. Thus, while the present disclosure focuses mainly on implementations where a payment request is received and satisfied (e.g., through a disbursement of funds), it should be appreciated that digital wallet system 110 can also perform pre-checks without facilitating an electronic funds transfer.

Example Use-Case

As a more detailed example use-case, consider a primary account owner, "John," who is anticipating a large medical expense for his child, Ms. Doe. John knows that his HSA and his spouse's HSA, even combined, will have insufficient funds for satisfying the anticipated medical expense. So, John decides to supplement the family's HSAs by saving additional money from his paycheck each month. These additional funds can be electronically transferred directly into a holding account associated with John's digital wallet, e.g., from John's employer's bank account. Additionally, John chooses to invest a portion of these additional savings through the digital wallet's investment manager with a plan to withdraw the funds when needed next year. John schedules a withdrawal of all funds from the investment account in January of the following year, which is when he is expecting the medical expense to come due. As an added precaution, John also adds a credit card to the digital wallet for any healthcare expenses that are incurred prior to the anticipated medical expense for his daughter.

The following year, when the anticipated medical expense comes due (e.g., based on receipt of one or more bills/payment requests), John's digital wallet (e.g., on digital wallet system 110) intelligently disburses funds according to the preferences John had set and/or various disbursement rules. For example, the digital wallet first transfers funds from the family's HSAs to pay for qualifying medical expenses. For any unqualified healthcare expenses, the digital wallet follows a priority that John, as the primary account owner, has predefined. For example, the digital wallet may first utilize the stored credit card and, when the credit card reached its limit (e.g., exactly or less a predefined dollar amount), the digital wallet may use the funds from any "cash components," such as the funds John was saving from his paycheck, funds contributed by Ms. Doe's grandparents, etc.

Digital Wallet System

Figure 2:
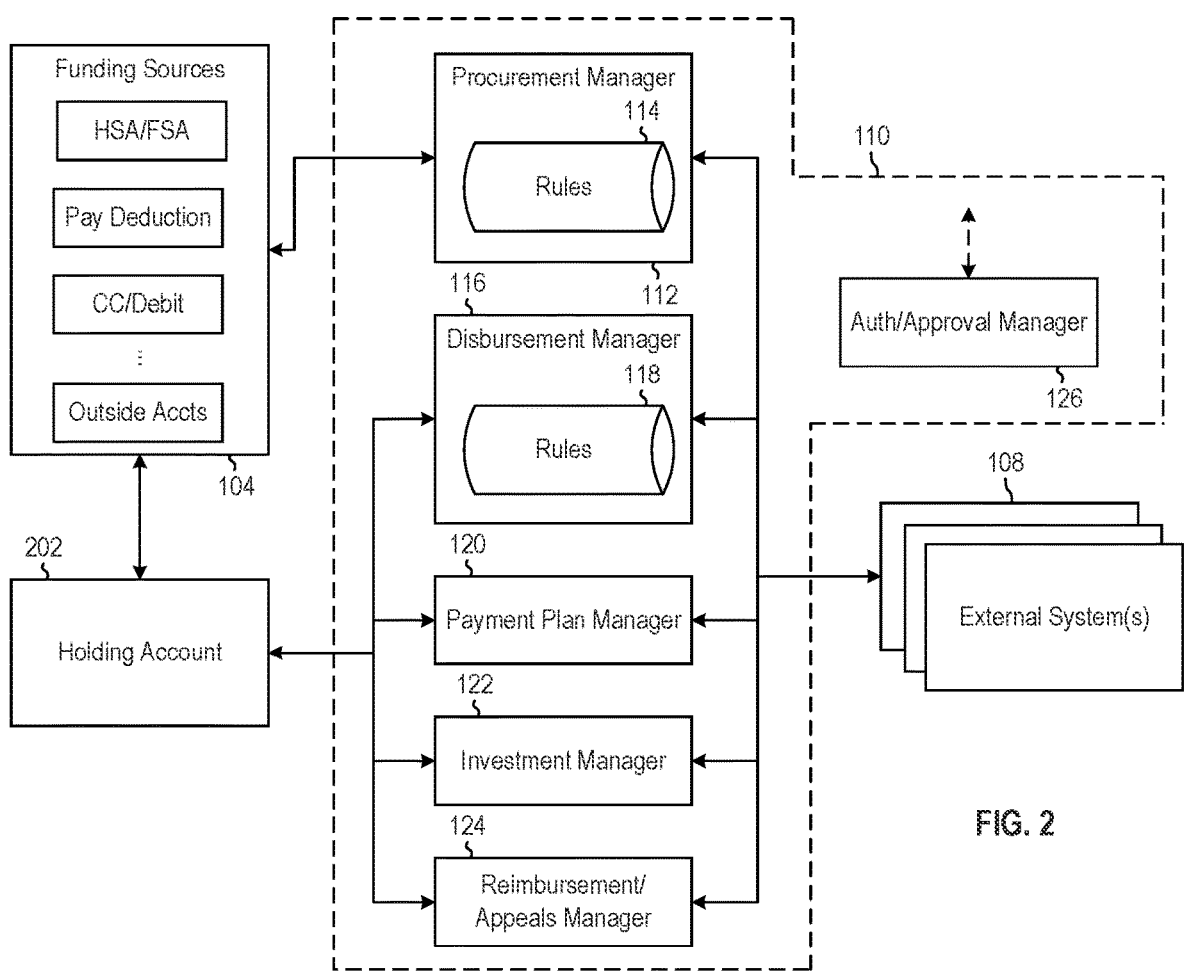
FIG. 2 is a block diagram of a digital wallet system, according to some implementations.

Referring now to FIG. 2, a more detailed block diagram of digital wallet system 110 is shown, according to some implementations. In particular, FIG. 2 illustrates the various components that form digital wallet system 110, including a procurement manager 112, a disbursement manager 116, a payment plan manager 120, an investment manager 122, a reimbursement/appeals manager 124, and an authorization/approval manager 126, each described in greater detail below. Generally, each of procurement manager 112, disbursement manager 116, payment plan manager 120, investment manager 122, reimbursement/appeals manager 124, and authorization/approval manager 126 can be considered "subsystems" of digital wallet system 110 that facilitate various functions of digital wallet system 110. Thus, in some implementations, the functionality of each of procurement manager 112, disbursement manager 116, payment plan manager 120, investment manager 122, reimbursement/appeals manager 124, and authorization/approval manager 126 can be implemented by a single computing device (e.g., a server), as discussed below with respect to FIG. 4.

However, it should be appreciated that, in various other implementations, the functionality of one or more of procurement manager 112, disbursement manager 116, payment plan manager 120, investment manager 122, reimbursement/appeals manager 124, or authorization/approval manager 126 may be implemented by a separate computing device from the other components of digital wallet system 110. For example, as described herein, procurement manager 112, disbursement manager 116, reimbursement/appeals manager 124, and authorization/approval manager 126 could each be implemented by a first computing device (e.g., a server), and payment plan manager 120 and investment manager 122 could be implemented by a second computing device. Thus, it should be appreciated that the present disclosure is not intended to be limiting in this regard. Rather, the functionality of digital wallet system 110, and the components thereof, as described herein, can be implemented by/on any number of computing devices.

Procurement manager 112 is generally configured to facilitate the procurement of funds from fund sources 104. More specifically, procurement manager 112 may facilitate the electronic transfer of funds from any of fund sources 104 to a holding account 202. Similar to a traditional bank account, holding account 202 is generally configured to maintain or "hold" funds obtained from any of fund sources 104. As described herein, holding account 202 may be implemented by (e.g., hosted on) digital wallet system 110 or may be an external account. For example, holding account 202 could be hosted by a financial institution that is separate from digital wallet system 110. Therefore, in implementations where holding account 202 is separate from digital wallet system 110, holding account 202 and digital wallet system 110 may be communicably coupled, e.g., via respective APIs. In any case, the present disclosure is not intended to be limiting in this regard; the functionality of holding account 202 is generally the same whether holding account 202 is hosted locally to digital wallet system 110 or on an external system.

As mentioned above, fund sources 104 can generally include any type of account, card, etc., that can electronically transfer funds to digital wallet system 110 and/or holding account 202. For example, fund sources 104 can include an HSA/FSA card, a credit/debit card, a bank account, another digital wallet, and the like. Thus, in some implementations, fund sources 104 includes one or more HSAs/FSAs or HSA/FSA cards. An HSA/FSA card is a type of debit card that allows users to withdraw funds from an HSA/FSA for paying qualifying medical expenses. HSAs/FSAs are often funded through a person's employer but can also be funded by an individual (e.g., if they are enrolled in a high-deductible healthcare plan). In most cases, HSAs/FSAs are limited in the types of expenses/transactions that they can be used to pay for, e.g., based on tax guidelines. Specifically, most HSAs/FSAs are limited to "qualified medical expenses" as defined by the Internal Revenue Service (IRS) or another entity. Notably, multiple HSA/FSA cards, or the accounts themselves, can be linked to digital wallet system 110. For example, a primary account owner could add their own HSA and could also add their spouse's HSA as fund sources. To this point, in some implementations, fund sources 104 can include one or more HSA/FSA sources that are not directly tied to the primary account owner or a beneficiary of the account. In some implementations, HSA/FSA funds are retained by their original institutions, rather than being transferred to holding account 202, to maintain compliance with tax regulations.

In some implementations, fund sources 104 include one or more credit or debit cards, or other forms of electronic payment card. For example, a primary account owner or secondary authorized account user could add a credit card for paying non-qualifying medical expenses and/or for supplementing HSA/FSA funds. In some implementations, fund sources 104 includes one or more credit or debit cards that are not directly tied to the primary account owner or a beneficiary of the account (e.g., if different from the primary account owner). For example, a grandparent could have their credit card added to the digital wallet account associated with their grandchild (e.g., by the grandchild's parents, who may be primary account owners) to assist with medical expenses. In some such implementations, fund sources 104 can include credit or debit cards that are associated with a third-party, e.g., other than a family member. For example, fund sources 104 could include a debit card provided by a charity. In some implementations, rather than adding funds from a credit/debit card to holding account 202, digital wallet system 110 can initiate electronic fund transfers directly from a credit/debit card entity to a recipient (e.g., by providing the recipient with a card number, expiration date, CVV, etc.). Notably, fund sources 104 can include accounts or cards associated with charities, crowd-funding entities, payment plan providers, and the like.

In some implementations, fund sources 104 include one or more bank accounts or "cash" sources. For example, a user can connect any external bank account to digital wallet system 110 and/or can directly transfer funds to holding account 202. In some implementations, funds can be transferred to holding account 202 through direct deposits or other recurring/non-recurring modes. For example, a user can have a set or variable amount of their paycheck directly deposited into holding account 202. Notably, "cash" contributions can come from multiple contributors, including contributors other than the primary account owner and/or a beneficiary of the account. Continuing a previous example, funds for a grandchild's digital wallet may come from their grandparent's trust or other donors. In some implementations, fund sources 104 can include non-traditional sources such as crowd-funded accounts, digital currency wallets, and the like.

As mentioned above, fund sources 104 can be connected to digital wallet system 110 by the primary account owner or any secondary authorized account user. To connect or "add" an external account (e.g., a bank account) a user may enter account information such as an account number, a routing number, a bank name, etc. For credit/debit cards, the user may enter a card number, an expiration date, a CVV or other security code, etc. In some implementations, a card (e.g., an HSA/FSA card, a credit/debit card, etc.) can be added by scanning the card or capturing a picture of the card, e.g., with a camera of user device 102. In some implementations, the user may also enter personal information such as an address, a zip code, a phone number, and the like; however, in other implementations, this type of personal information is entered when the user creates their digital wallet account. In some implementations, a user can sign in to an external account through digital wallet system 110 in order to authorize a connection between the external account and digital wallet system 110. In some such implementations, the user may provide login credentials to the external account. For example, a user may sign in to an external bank account by entering a username and password in a user interface generated by digital wallet system 110.

In some implementations, various fund sources can be connected to digital wallet system 110 without being directly tied to an individual digital wallet account. For example, various charities, payment plan providers, crowd-funding sites, and the like may connect accounts to digital wallet system 110. In some such implementations, procurement manager 112 can facilitate adding these types of pre-established accounts to a user's digital wallet account, e.g., through a search function. For example, procurement manager 112 may provide a user (e.g., the primary account owner) with a search tool that allows the user to search for various fund sources which can be added to their digital wallet account. In some implementations, the user can select an account and request to have the account added to their digital wallet. For example, the user may search for charities and can request funding from the charity directly through digital wallet system 110.

In some implementations, digital wallet system 110 considers various procurement rules when procuring funds from fund sources 104. Procurement rules are any rules and/or preferences that dictate how funds are obtained or "procured" from fund sources 104, e.g., to be sent to a recipient and/or stored in holding account 202. In some implementations, a user (e.g., the primary account owner) can define procurement rules when connecting, or after connecting, any of fund sources 104 to digital wallet system 110. Likewise, certain external fund source can define their own procurement rules. User- and/or source-defined procurement rules may be stored in a procurement rules database 114 associated with procurement manager 112. In various implementations, procurement rules database 114 can store rules that dictate how often funds are procured from specific sources (e.g., of fund sources 104), the amount of funds that can be procured from any of fund sources 104, the mechanism by which funds are transferred (e.g., the type of communication pathway, encryption parameters, etc.), when funds are transferred, and the like. For example, procurement rules database 114 could include a procurement rule that causes digital wallet system 110 to retrieve funds from "Bank A" if a balance in holding account 202 falls below a threshold. As another example, procurement rules database 114 could include a procurement rule that causes digital wallet system 110 to retrieve a set amount of funds from "Bank A" every 30 days. It should therefore be appreciated that a variety of procurement rules are contemplated herein and that the preceding examples are not intended to be limiting.

As shown in FIG. 2, procurement manager 112 may be configured to interact with one or more of fund sources 104 in order to procure funds. In some implementations, procurement manager 112 is configured to send fund requests and/or commands in order to initiate electronic fund transfers to holding account 202. For example, procurement manager 112 may transmit a fund transfer request to a financial institution's computing system (e.g., one of external system(s) 108) to cause the financial institution's computing system to electronically transfer funds to holding account 202. In some implementations, one or more of fund sources 104 can transfer funds directly to procurement manager 112, which then moves the funds into holding account 202 or another external account. In some implementations, where holding account 202 is external to digital wallet system 110, procurement manager 112 is also in communication with holding account 202, e.g., to check the balance of holding account 202, to monitor the amount of funds received from each of holding account 202, and the like.

Disbursement manager 116 is generally configured to facilitate the disbursement of funds from fund sources 104 and/or holding account 202 responsive to an electronic payment request. As described herein, "disbursement" generally refers to the apportionment and subsequent electronic transfer of funds from fund sources 104 and/or holding account 202, e.g., to a recipient. To this point, disbursement manager 116 is generally configured to evaluate received electronic payment requests to determine how to apportion funds from fund sources 104 and can also facilitate the electronic transfer of funds to a recipient. It should be understood, however, that apportioning funds does not necessarily directly relate to procuring funds from fund sources 104; although, in some cases, funds may be transferred to a recipient directly from one of fund sources 104. Instead, in implementations where funds are maintained in holding account 202, disbursement manager 116 determines how to apportion funds that are associated with (e.g., previously procured from) each of fund sources 104. For example, holding account 202 may hold $500 in funds from "Source 1" and $1000 in funds from "Source 2," for a total of $1500 in funds. However, funds from "Source 1" may be restricted to use for qualifying medical expenses. If a $1200 payment request is received, disbursement manager 116 may be configured to determine how to apportion funds from "Source 1" and "Source 2" to satisfy the payment request while abiding by various disbursement rules, as discussed below.

Generally, with respect to digital wallet system 110, electronic payment requests are received from requesting device 106 and/or one of external system(s) 108. As mentioned above, an electronic payment request is a form of digital bill or transaction which requests payment for goods and/or services. For example, a healthcare billing company may submit (e.g., to digital wallet system 110) an itemized bill for healthcare services related to a patient. In this example, the itemized bill may be a form of electronic payment request. As another example, the electronic payment request may be received from a point-of-sale device. In some implementations, the electronic payment request is an electronic healthcare claim. For example, healthcare providers could send electronic healthcare claims directly to digital wallet system 110 for payment. In some implementations, the electronic payment request is a reimbursement request, e.g., submitted by a user or owner of digital wallet system 110. For example, the primary account owner may submit reimbursement requests to digital wallet system 110 to be paid back for out-of-pocket expenses.

Upon receipt, disbursement manager 116 evaluates electronic payment requests to determine how to disburse (e.g., apportion and transfer) funds from one or more of fund sources 104 to satisfy the request. Specifically, disbursement manager 116 evaluates electronic payment requests with respect to a plurality of disbursement rules in a disbursement rules database 118. Disbursement rules database 118 generally includes user-defined, fund-defined, and/or third-party-defined disbursement rules, which dictate how funds are apportioned. User-defined rules generally include any rules that are defined by a user of digital wallet system 110, including a primary account owner and any secondary authorized account users of a digital wallet account. Fund-defined rules generally include any rules that are defined by respective ones of fund sources 104. Third-party-defined rules generally include any rules that are defined by an entity other than the primary account owner or secondary authorized account users of a digital wallet account and fund sources 104. Disbursement rules database 118 can therefore generally include a variety of rules relating to transaction limits, transaction type, priority, etc.

In some implementations, the rules contained in disbursement manager 116 are in the form of conditional statements (e.g., "if x, then y"); however, it should be appreciated that other rule formats are contemplated herein. In any case, rules may be maintained in disbursement rules database 118, e.g., as structured, semi-structured, and/or unstructured data. For example, disbursement rules database 118 may maintain a table of disbursement rules wherein a condition (e.g., "if request <$500") is mapped to an outcome or consequence (e.g., "then use funds from Source 1"). In other implementations, disbursement rules are simply values (e.g., thresholds).

In some implementations, user-defined rules are received via user input, e.g., when a user sets up a digital wallet account or at any point thereafter. For example, a primary account owner may set one or more disbursement rules when creating their digital wallet account and/or a secondary authorized account user could set disbursement rules after the digital wallet account is created. In some implementations, fund-defined rules are obtained directly from fund sources 104, e.g., when a fund is connected to the digital wallet account. In some such implementations, any of fund sources 104 may periodically or occasionally transmit new or updated rules to digital wallet system 110, which are then used to update disbursement rules database 118. In some implementations, third-party-defined rules are obtained directly from a third-party source. For example, Medicare/Medicaid rules may be received from or retrieved from a remote database, system, or website.

In some implementations, disbursement rules database 118 includes one or more transaction-specific rules which dictate how funds are disbursed based on a type of payment request and/or based on the individual line items or expenses contained within the payment request. For example, disbursement rules database 118 may include a plurality of set limits (e.g., a dollar value) on the amount of funds that can be apportioned from each of fund sources 104 based on transaction or expense type, recipient/requestor/merchant identifier, etc. In some implementations, disbursement rules database 118 includes one or more user-specific rules which dictate how funds are disbursed based on user preferences. For example, user-specific rules may assign a priority to fund sources 104 for apportioning funds (e.g., use "Fund A first, then Fund B"), which may also be based on payment request or expense type. In some implementations, disbursement rules database 118 includes one or more fund-specific rules which dictate how funds are disbursed based on limits set by each of fund sources 104.

In some implementations, disbursement rules database 118 includes one or more regulatory rules which dictate how funds are disbursed based on government and/or regulatory entity requirements (e.g., CMS, Medicare/Medicaid, etc.). For example, Medicare/Medicaid may define rules that limit how associated funds are disbursed. In some implementations, disbursement rules database 118 includes rules about the types of expenses that qualify as "qualifying healthcare expenses" as dictated by the IRS or another entity. For example, the IRS may dictate the type of goods and services that can be paid for with funds from an HSA/FSA. In some such implementations, disbursement manager 116 may be configured to determine whether the expenses contained in a payment request are qualifying medical expenses, which may factor into how funds are disbursed. For example, funds from an HSA or FSA may only be used to pay for qualifying medical expenses; thus, if disbursement manager 116 determines that a payment request contains non-qualifying expenses, then disbursement manager 116 may identify one or more additional sources from which to apportion funds to satisfy the payment request.

It should be appreciated that disbursement rules database 118 can also include aggregate rules that account for multiple parameters. For example, aggregate rules can include a limit on certain transaction types from a single party (e.g., opioid transactions issued from a certain issuing or paid entity), thresholds based on transaction type, etc. Additional example rules can include, but are not limited to: restrictions or preferences on the fund sources from which funds are apportioned based on transaction type or amount (e.g., if the requested amount is greater than a threshold, pay first from "Fund A"); restrictions or preferences on the fund sources from which funds are apportioned based on payment request or service date (e.g., if the request is related to a visit in October, use "Fund B"); rules related to request frequency or timing; rules related to merchant/requestor/provider type or identifier; etc. Consider, for example, a digital wallet account for a minor with multiple caregivers. The primary account owner and/or a secondary authorized account user, in this example, may define multiple rules that dictate an amount of funds sources from various fund sources based on transaction time. For example, a fund source owned by the minor's grandparents is set to pay 30% for each payment request, while the parent's account pays 70%. However, a rule may also be established that the grandparent's account is only used for medical expenses, whereas the parent's accounts can be used for medical and dental expenses.

In some implementations, disbursement manager 116 is configured to extract data from received electronic payment requests for evaluation. In some such implementations, disbursement manager 116 may parse the electronic payment request to extract a set of relevant data points, such as a type, identifier, and value of each line item or expense in the request. In some implementations, disbursement manager 116 can extract additional data (e.g., from a header of the electronic payment request), such as identifying information for the requestor, recipient, and/or person associated with the electronic payment request. In some implementations, disbursement manager 116 includes a natural language processing (NLP) model that assists with data extraction by processing free text and/or other unstructured data. An NLP is generally an AI model—specifically, a type of machine learning model—that can parse free text and/or human speech. For example, disbursement manager 116 may use an NLP to identify the line items in a received electronic payment request, which in turn informs a "type" of expense for each item. In some implementations, disbursement manager 116 can be configured to initially identify a type of electronic payment request (e.g., electronic healthcare claim, reimbursement, etc.) which can inform how to extract data. For example, disbursement manager 116 may extract data from predefined fields of an electronic healthcare claim, as most electronic healthcare claims will be received in the same format. In contrast, receipts for expenses from a pharmacy may not follow a predefined format and may therefore require additional processing (e.g., using an NLP) to extract relevant data.

In some implementations—particularly in implementations where disbursement rules are defined as conditional (e.g., "if-then") statements—disbursement manager 116 directly compares data extracted from an electronic payment request, or the electronic payment request itself, against the rules in disbursement rules database 118. For example, disbursement manager 116 may compare the extracted data from the payment request to each of the rules in disbursement manager 116 to determine whether the rule parameters are met and/or may take an associated action if a condition is met. In some such implementations, disbursement manager 116 may follow a user-defined priority regarding the fund sources from which to disburse funds. For example, disbursement manager 116 may determine that, for a received payment request, funds should be disbursed from "Fund A," "Fund B," and "Fund F," and may intelligently determine the order in which funds are disbursed based on user-defined rules (e.g., first use "Fund F," then "Fund B," then "Fund A").

Additionally, or alternatively, in some implementations, disbursement manager 116 includes an AI model that can intelligently determine how to disburse funds to satisfy a payment request. In particular, disbursement manager 116 may include an AI model that is trained based on the various disbursement rules (e.g., in disbursement rules database 118) to determine how to disburse funds from fund sources 104. In some implementations, an electronic payment request, or data extracted therefrom, is provided as an input to the AI model and the AI model outputs an indication of the fund source(s) from which funds should be disbursed, a value of the funds to be disbursed from each fund source, and, optionally, an order (e.g., prior) of fund sources from which the funds should be disbursed. As described herein, the AI model may be any suitable AI model or, more specifically, any machine learning model.

The term "artificial intelligence" is defined herein to include any technique that enables one or more computing devices or comping systems (i.e., a machine) to mimic human intelligence. AI includes, but is not limited to, knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders. The term "deep learning" is defined herein to be a subset of machine learning that that enables a machine to automatically discover representations needed for feature detection, prediction, classification, etc. using layers of processing. Deep learning techniques include, but are not limited to, artificial neural networks (ANN) or multilayer perceptron (MLP).

Machine learning models include supervised, semi-supervised, and unsupervised learning models. In a supervised learning model, the model learns a function that maps an input (also known as feature or features) to an output (also known as target or targets) during training with a labeled data set (or dataset). In an unsupervised learning model, the model learns patterns (e.g., structure, distribution, etc.) within an unlabeled data set. In a semi-supervised model, the model learns a function that maps an input (also known as feature or features) to an output (also known as target or target) during training with both labeled and unlabeled data. Generally, as described herein, the AI or machine learning model implemented by disbursement manager 116 may be trained using the disbursement rules from disbursement rules database 118.

In some implementations, fund disbursement is based in part on retrospective spending or disbursement patterns. Thus, in some such implementations, the AI model can be trained, in part, to identify and extrapolate patterns in spending or disbursement. In particular, the AI model may be trained on a digital wallet account's disbursement history and/or the disbursement history for the digital wallet account's primary beneficiary in order to identify patterns and make disbursement decisions. For example, the AI model may evaluate a digital wallet account beneficiary's past disbursements to determine that their average monthly expenditure is close to $2000; thus, the AI model may determine that holding account 202 should not fall below $2000 and disbursement manager 116 can reserve $2000 in holding account 202 (e.g., to prevent or reduce the need for sourcing funds from an investment portfolio). In some implementations, the AI model can evaluate seasonality and episode type in making disbursement decisions. For example, disbursement manager 116 may determine (e.g., via the AI model) that a user's expenses are often higher in the fall (e.g., between September and November) and therefore can reserve additional funds during these months. In another example, the AI model could determine that the digital wallet account's beneficiary is pregnant based on disbursement patterns and can thus retain appropriate funds for paying of the delivery expenses. In other words, the AI model—and, by extension, disbursement manager 116—could be trained to reserve funds for anticipated expenses without requiring a user to explicitly set complex rules.

In some implementations, disbursement manager 116 can further consider a user's healthcare insurance information when determining how to disburse funds. In some such implementations, disbursement manager 116—or, more broadly, digital wallet system 110—may be in communication with an external system (e.g., one of external system(s) 108) associated with a healthcare insurance company. For example, the primary account owner may enter insurance information for the beneficiary of the digital wallet account when creating the account, which digital wallet system 110 can use to connect to the beneficiary's insurance company. Thus, when a payment request (e.g., an electronic healthcare claim) is received, disbursement manager 116 can contact the healthcare insurance company to determine if any of the expenses in the payment request are covered by the associated person's healthcare insurance and/or whether any of the expenses in the payment request are qualifying medical expenses.

After determining how to apportion funds from fund sources 104 to satisfy the payment request, disbursement manager 116 can facilitate the electronic transfer of funds from holding account 202 to a recipient (e.g., requesting device 106). For example, disbursement manager 116 itself may electronically transfer funds to a recipient, such as by communicating with the recipient's computer and/or the recipient's financial institution. As another example, disbursement manager 116 may communicate with an external system that maintains holding account 202 (e.g., if hosted outside of digital wallet system 110) to cause the external system to transfer funds to the recipient's computer and/or the recipient's financial institution. Additionally, or alternatively, digital wallet system 110 can initiate a transfer of funds from one of fund sources 104 directly to a recipient. For example, funds from certain sources (e.g., credit cards) may not be eligible for maintenance in holding account 202 but may still be obtained to satisfy payment requests, in which case disbursement manager 116 may communicate with an external system (e.g., one of external system(s) 108) to cause the external system to initiate an electronic funds transfer.

Payment plan manager 120 is generally configured to facilitate payment plans for satisfying received payment requests, e.g., in addition to or in lieu of funds from fund sources 104. In some implementations, payment plans are provided through an external entity (e.g., one of external system(s) 108), such as a financial institution; however, digital wallet system 110 may also be configured to provide payment plan options to users. As will be understood to those in the art, a payment plan allows a user to pay back loaned funds over time, often with interest. Accordingly, payment plan manager 120 may coordinate payment plans with external sources to provide payment plan options to a user of digital wallet system 110. In some implementations, a payment plan is automatically established due to a trigger event. For example, if holding account 202 reaches a lower threshold value, payment plan manager 120 may automatically retrieve payment plan offers and/or may automatically enroll the user of the digital wallet account into a payment plan to satisfy payment requests. In some implementations, payment plan manager 120 can coordinate with external systems (e.g., one of external system(s) 108) to manage external payment plans. In some implementations, payment plan manager 120 can seek explicit approval prior to initiating a payment plan, e.g., by sending a notification to the primary account owner or another user of a digital wallet account. For example, payment plan manager 120 may prompt the user to start a payment plan if holding account 202 does not contain sufficient funds.

Investment manager 122 is generally configured to facilitate the investment of funds from holding account 202, e.g., into various investment vehicles such as stocks, certificates of deposit (CDs), mutual funds, and the like. In some implementations, investment vehicles are provided through an external entity (e.g., one of external system(s) 108), such as an external brokerage account. Accordingly, investment manager 122 may coordinate with one or more of external system(s) 108 to electronically transfer and invest funds. In some implementations, funds can be automatically invested based on rules and/or user preferences. For example, investment manager 122 may automatically transfer and invest funds after holding account 202 reaches a certain threshold value. As another example, investment manager 122 may retain a set amount of funds in holding account 202 and invest the remainder. In some implementations, investment manager 122 can prompt a user to invest funds, e.g., by providing a notification. In some implementations, investment manager 122 further manages the automatic sale and retrieval (e.g., via electronic fund transfer) of funds from external investment accounts to facilitate payments and/or to add funds to holding account 202. For example, investment manager 122 may automatically sell investments and transfer funds back to holding account 202 if holding account 202 falls below a threshold value.

Reimbursement/appeals manager 124 is generally configured to facilitate reimbursements and appeals, e.g., out-of-pocket expenses and denied payments, respectively. As mentioned above, in some implementations, digital wallet system 110 can receive reimbursement requests as a form of electronic payment request. A reimbursement request is a request for repayment for an out-of-pocket expense incurred by the primary account owner or a secondary authorized account user. For example, a user may pay for medication at a pharmacy out of pocket and may submit a reimbursement request to their digital wallet account to be paid back. In some such implementations, reimbursement/appeals manager 124 can evaluate the reimbursement request and, if approved, can facilitate the transfer of funds to an external account (e.g., the requesting user's bank account). In some implementations, reimbursement/appeals manager 124 can accept reimbursement requests for secondary authorized account user or other outside parties. In some such implementations, reimbursement/appeals manager 124 may notifier the primary account owner and may request approval/denial of the reimbursement request. Occasionally, the retrieval and/or disbursement of funds from a particular fund source may be denied for one reason or another. In some such implementations, reimbursement/appeals manager 124 can facilitate a payment from a secondary source (e.g., another of fund sources 104) to satisfy a payment request and can request an appeal from original funding source that denied the payment.

Authorization/approval manager 126 is generally configured to facilitate secure access to a digital wallet account and, optionally, the generation of notifications. Generally, all user access to digital wallet system 110 is routed through authorization/approval manager 126 unless integrated explicitly through another system. For example, an investment vehicle connected through an API to an external brokerage account, where the API has a built-in validation, may not require explicit authorization for every communication. However, the initial connection between the external brokerage account and digital wallet system 110 may be facilitated by authorization/approval manager 126. In addition, authorization/approval manager 126 may facilitate user logins to access a digital wallet account.

Generally, authentication and authorization through authorization/approval manager 126 requires that a user input credentials (e.g., to a login page displayed on a web browser, when logging in through a smartphone application, etc.), such as a username, email, or other identifier and a password, a biometric login (e.g., fingerprint, facial scan, iris scan), or other suitable credentials (e.g., a digital signature, such as a digital identity stored in a distributed ledger or a Web 3 solution). In some implementations, authorization/approval manager 126 utilizes public or private tokens to provide secure access from/to remote devices. Public or private tokens, such as cryptographic tokens or digital certificates, can be used to establish secure connections and verify the authenticity of entities involved in a transaction. Tokens can be used for user authentication, ensuring that only authorized individuals can access a digital wallet account. For example, when a user tries to log in to a digital wallet account by providing their username and password, authorization/approval manager 126 may issue a public token to the user's device (e.g., the user's computer or smartphone) to verify their identity. Tokens can therefore establish a secure communication channel between user devices and digital wallet system 110 (e.g., over a secure protocol such as HTTPS). A token is generally used to encrypt and decrypt the data transmitted between the two parties, ensuring the confidentiality and integrity of the information. In addition, a token can be used to verify the integrity and authenticity of transactions. For example, when initiating a transaction, authorization/approval manager 126 may issue a digital signature using the user's private key. The recipient of the transaction can then verify the signature using the user's public key, ensuring that the transaction was not tampered with and was indeed authorized by the account holder.

In some implementations, authorization/approval manager 126 can generate notifications or "flags" to request approval for certain transactions, include payment request and access to the digital wallet account. For example, a primary account owner may establish a rule to have any transaction (e.g., payment request) over a specified dollar amount (e.g., or beyond a certain percentage of funds in holding account 202) flagged for manual approval. As another example, authorization/approval manager 126 could generate a notification to request approval before obtaining/disbursing funds from a specific one of fund sources 104. Sometimes, flags could be initiated by a non-participatory entity, such as a regulatory body. Generally, authorization/approval manager 126 may be configured to generate both internal and external notifications. For example, internal notifications could be triggered by any component of digital wallet system 110 and could be transmitted only to users associated with a specific digital wallet account. However, external notifications could be transmitted to any external entity (e.g., an external bank), for example, to report suspected fraudulent activity notified or to flag a payment request for an external system review.

Figure 3:
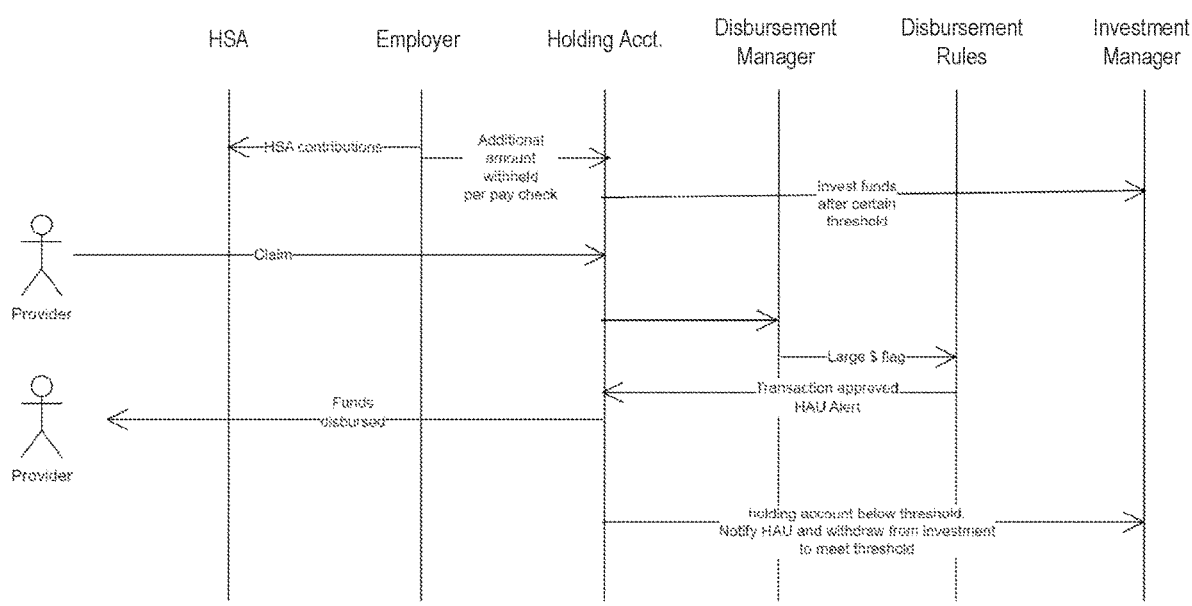
FIG. 3 is a diagram of an example use-case of the digital wallet system of FIG. 2, according to some implementations.

For added clarity regarding the various functions of digital wallet system 110 and the components thereof, as described above, reference is now made to FIG. 3 which shows a diagram of an example use-case of digital wallet system 110 based on the example-use case for "John" mentioned above. As shown, the employer of a primary account owner for a digital wallet helps to fund the digital wallet by withholding, from the primary account owner's paycheck, HSA contributions and an additional amount. Generally, the HSA contributions may be automatically transferred, by the employer, to the primary account owner's HSA (e.g., which is separately held from the digital wallet account). In addition, the employer transfers a set amount of funds (e.g., as dictated by the primary account owner) to holding account 202 associated with the primary account owner's digital wallet. From there, investment manager 122 may automatically invest all or some of the funds, e.g., via an external investment vehicle.

At some point, a healthcare provider is shown to submit a payment request in the form of an electronic healthcare claim, which is received by digital wallet system 110. Subsequently, the electronic healthcare claim is evaluated by disbursement manager 116 to determine how to disburse fund from holding account 202. In this example, the electronic healthcare claim exceeds a predefined threshold amount (e.g., as defined in disbursement rules database 118) which causes a notification to be generated and transmitted to the primary account owner's device. As mentioned above, the notification may prompt the primary account owner to approve or deny the payment request. Assuming the primary account owner approves of the request, disbursement manager 116 can manage the disbursement of fund from holding account 202 to the healthcare provider that submitted the payment request. Additionally, in this example, it is determined that holding account 202 is below a threshold value after electronically transferring funds from holding account 202 to the healthcare provider. So, the primary account owner is notified and investment manager 122 automatically withdraws funds from the external investment account to replenish holding account 202.

Figure 4:
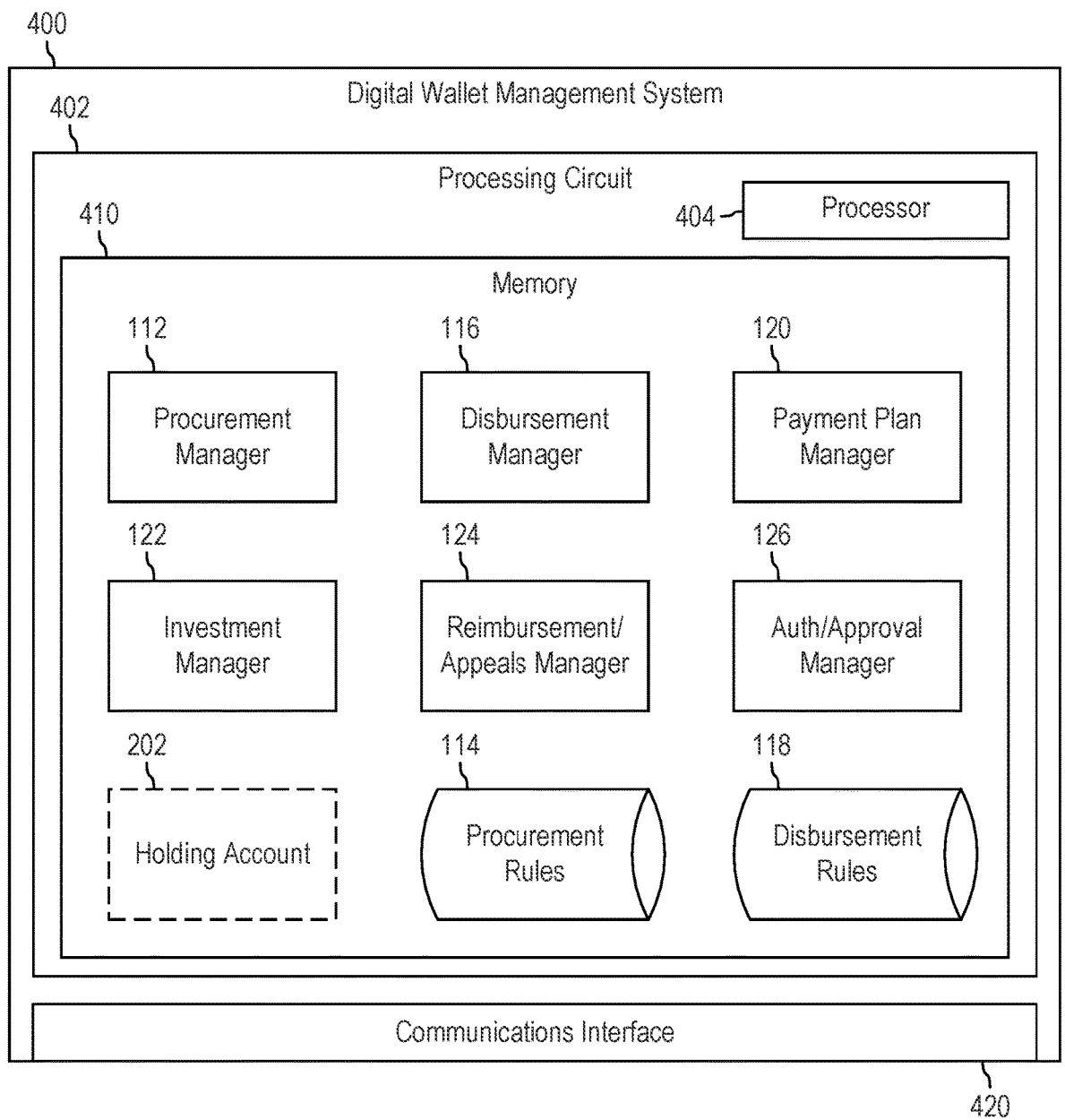
FIG. 4 is a detailed block diagram of a digital wallet management system, according to some implementations.

Referring now to FIG. 4, a detailed block diagram of a digital wallet management system 400 is shown, according to some implementations. Generally, as mentioned above, digital wallet management system 400 is an example implementation of digital wallet system 110. For example, as described in greater detail below, any of procurement manager 112, procurement rules database 114, disbursement manager 116, disbursement rules database 118, payment plan manager 120, investment manager 122, appeals manager 124, and approval manager 126—and/or the functionality thereof—may be implemented by digital wallet management system 400. However, it should be appreciated that other implementations are contemplated herein, e.g., where one or more of procurement manager 112, procurement rules database 114, disbursement manager 116, disbursement rules database 118, payment plan manager 120, investment manager 122, appeals manager 124, or approval manager 126 are implemented via a separate device or system.

Digital wallet management system 400 is shown to include a processing circuit 402 that includes a processor 404 and a memory 410. Processor 404 can be a general-purpose processor, an application-specific integrated circuit (ASIC), one or more field programmable gate arrays, (FPGAs), a group of processing components, or other suitable electronic processing structures. In some implementations, processor 404 is configured to execute program code stored on memory 410 to cause digital wallet management system 400 to perform one or more operations, as described below in greater detail. It will be appreciated that, in implementations where digital wallet management system 400 is part of another computing device, the components of digital wallet management system 400 may be shared with, or the same as, the host device. For example, if digital wallet management system 400 is implemented via a server (e.g., a cloud server), then digital wallet management system 400 may utilize the processing circuit, processor(s), and/or memory of the host server to perform the functions described herein.

Memory 410 can include one or more devices (e.g., memory units, memory devices, storage devices, etc.) for storing data and/or computer code for completing and/or facilitating the various processes described in the present disclosure. In some implementations, memory 410 includes tangible (e.g., non-transitory), computer-readable media that stores code or instructions executable by processor 404. Tangible, computer-readable media refers to any physical media that is capable of providing data that causes digital wallet management system 400 to operate in a particular fashion. Example tangible, computer-readable media may include, but is not limited to, volatile media, non-volatile media, removable media, and non-removable media implemented in any method or technology for storage of information such as computer-readable instructions, data structures, program modules, or other data. Accordingly, memory 410 can include random access memory (RAM), read-only memory (ROM), hard drive storage, temporary storage, non-volatile memory, flash memory, optical memory, or any other suitable memory for storing software objects and/or computer instructions. Memory 410 can include database components, object code components, script components, or any other type of information structure for supporting the various activities and information structures described in the present disclosure. Memory 410 can be communicably connected to processor 404, such as via processing circuit 402, and can include computer code for executing (e.g., by processor 404) one or more processes described herein.

While shown as individual components, it will be appreciated that processor 404 and/or memory 410 can be implemented using a variety of different types and quantities of processors and memory. For example, processor 404 may represent a single processing device or multiple processing devices. Similarly, memory 410 may represent a single memory device or multiple memory devices. Additionally, in some implementations, digital wallet management system 400 may be implemented within a single computing device (e.g., one server, one housing, etc.). In other implementations, digital wallet management system 400 may be distributed across multiple servers or computers (e.g., that can exist in distributed locations). For example, digital wallet management system 400 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by two or more computers. For example, virtualization software may be employed by digital wallet management system 400 to provide the functionality of a number of servers that is not directly bound to the number of computers in digital wallet management system 400.

Digital wallet management system 400 is also shown to include a communications interface 420 that facilitates communications between digital wallet management system 400 and any external components or devices, including any of external system(s) 108. For example, communications interface 420 can provide means for communicating with (e.g., transmitting data to and/or receiving data from) external bank accounts, credit/debit card company computing systems, healthcare insurance company computing system, etc. Accordingly, communications interface 420 can be or can include a wired or wireless communications interface (e.g., jacks, antennas, transmitters, receivers, transceivers, wire terminals, etc.) for conducting data communications, or a combination of wired and wireless communication interfaces. In some implementations, communications via communications interface 420 are direct (e.g., local wired or wireless communications) or via a network (e.g., a WAN, the Internet, a cellular network, etc.). For example, communications interface 420 may include one or more Ethernet ports for communicably coupling digital wallet management system 400 to a network (e.g., the Internet). In another example, communications interface 420 can include a Wi-Fi transceiver for communicating via a wireless communications network. In yet another example, communications interface 420 may include cellular or mobile phone communications transceivers.

As shown, memory 410 can include procurement manager 112, procurement rules database 114, disbursement manager 116, disbursement rules database 118, payment plan manager 120, investment manager 122, appeals manager 124, and approval manager 126, all of which are described in detail above. Thus, any of procurement manager 112, procurement rules database 114, disbursement manager 116, disbursement rules database 118, payment plan manager 120, investment manager 122, appeals manager 124, and approval manager 126 may communicate with fund sources 104, requesting device 106, and/or external system(s) 108 via communications interface 420. In some implementations, memory 410 further includes holding account 202, as also described above. In other words, holding account 202 may be hosted on and/or maintained by digital wallet management system 400. However, in other implementations, holding account 202 may be hosted on and/or maintained by an external system or device.

Digital Wallet Account Creation

Figure 5:
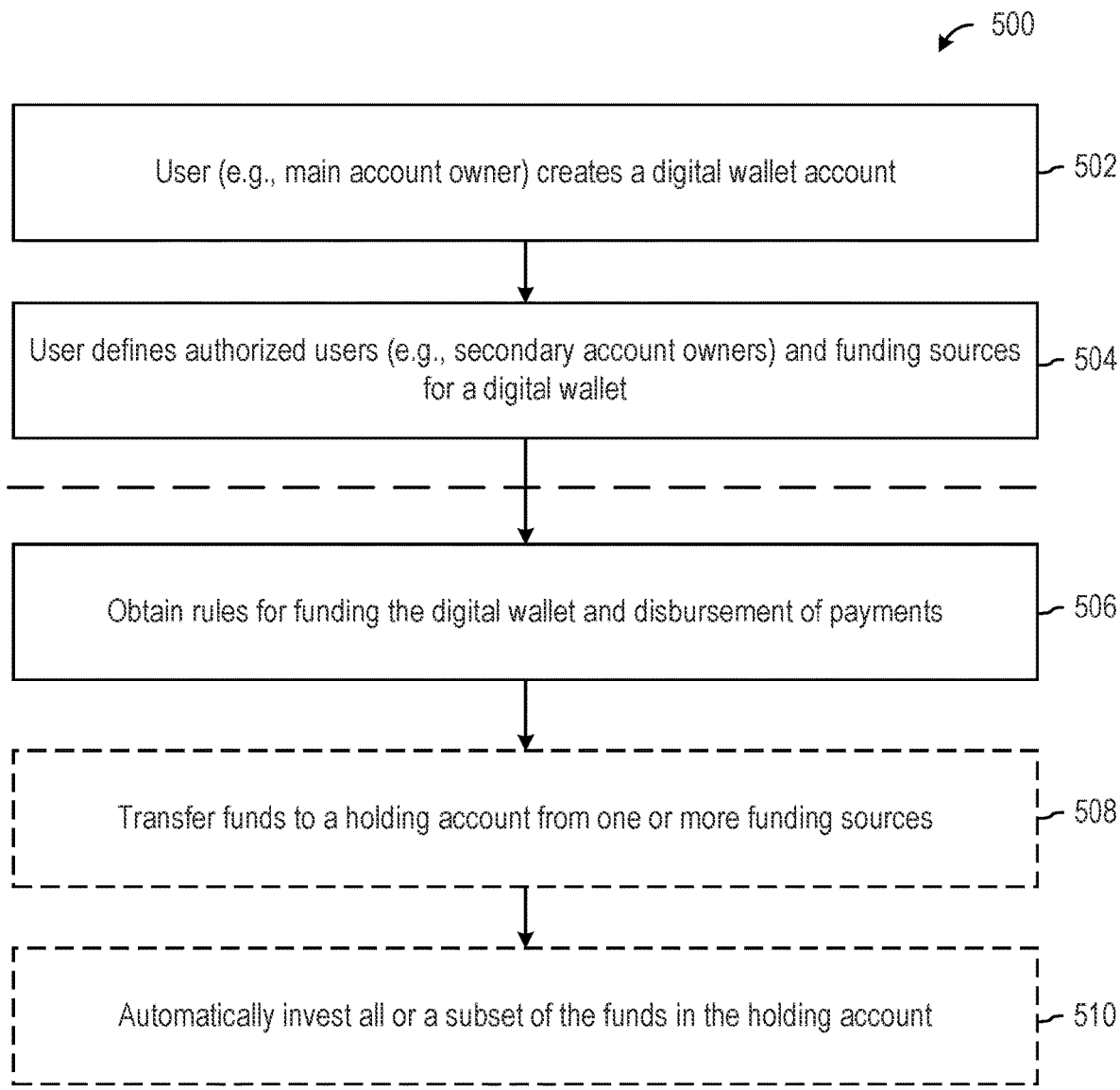
FIG. 5 is a flow diagram of a process for establishing a digital wallet account, according to some implementations.

Referring now to FIG. 5, a flow diagram of a process 500 for establishing a digital wallet account is shown, according to some implementations. As shown, certain steps of process 500 can be implemented by digital wallet management system 400, as described above, and other steps of process 500 can be implemented by a user (e.g., a primary account owner). It will be appreciated that certain steps of process 500 may be optional and, in some implementations, process 500 may be implemented using less than all of the steps. It will also be appreciated that the order of steps shown in FIG. 5 is not intended to be limiting.

At step 502, a user creates a digital wallet account on digital wallet system 110. Generally, the digital wallet account creation process starts with the user providing desired login credentials (e.g., a username and/or email, a password, etc.) and various personal information. For example, the user may provide a name, an address, a phone number, etc. In some implementations, as discussed above, the user may create a digital wallet account for themselves; in which case, the user may provide their own personal information. However, in other implementations, the user may create a digital wallet account on behalf of another person (e.g., a dependent). In some implementations, as part of the account creation process, digital wallet system 110 may generate a security token which is shared with the user's device, e.g., to facilitate future digital wallet account access.

At step 504, the user connects fund sources to the digital wallet account. As mentioned above, fund sources (e.g., fund sources 104) can include any external account, card, or other source of funds. For example, the user may connect external bank accounts, credit/debit cards, HSAs/FSAs, and the like to their digital wallet account. In some implementations, a user can connect third-party fund sources, such as charity accounts, crowd-funding accounts, payment plan accounts, investment accounts, and the like. In addition, the user may add secondary authorized account users that can access the digital wallet account. In some implementations, the user (e.g., the primary account owner) can set limitations on secondary authorized account users with respect to the functionality of the digital wallet. For example, the primary account owner may allow secondary authorized account users to view fund sources and/or amounts but prevent secondary authorized account users from adding or removing fund sources. In some implementations, the user can enter an email address, phone number, or other contact information for one or more secondary authorized account users, which causes a notification to be transmitted to each secondary authorized account user prompting the secondary authorized account users to create respective accounts through digital wallet system 110, e.g., for access to the digital wallet account.

For example, a parent may create a digital wallet account on behalf of their child (e.g., at step 502) and may add a second parent and grandparents as secondary authorized account users. In some cases, each of the second parent and the grandparents may receive a notification (e.g., an email) prompting them to create their own account (e.g., by providing credentials and personal information) to access the digital wallet account associated with the child. Subsequently, the primary account user and any of the secondary authorized account users may access the digital wallet account by inputting their credentials (e.g., via a user interface, such as a web browser). Digital wallet system 110 may then verify the user credentials and, if the user requesting access is authorized, permit access to the digital wallet account if the user credentials. In some implementations, the digital wallet account is accessed to add a new fund source or remove an existing fund source; however, other functions described herein may be implemented via subsequent account access.

At step 506, a set of procurement rules and a set of disbursement rules are obtained. As described above, procurement rules are any rules and/or preferences that dictate how funds are obtained or "procured" from fund sources 104. In some implementations, procurement rules are defined by a user (e.g., the primary account owner or secondary authorized account user); however, procurement rules can also be set by each connected fund source. As also described above, disbursement rules are any rules and/or preferences that dictate how funds are apportioned and transferred from fund sources 104 and/or holding account 202. In some implementations, disbursement rules are defined by a user (e.g., the primary account owner or secondary authorized account user); however, disbursement rules can also be set by each connected fund source and/or other third parties (e.g., a regulatory body).

Figure 8:
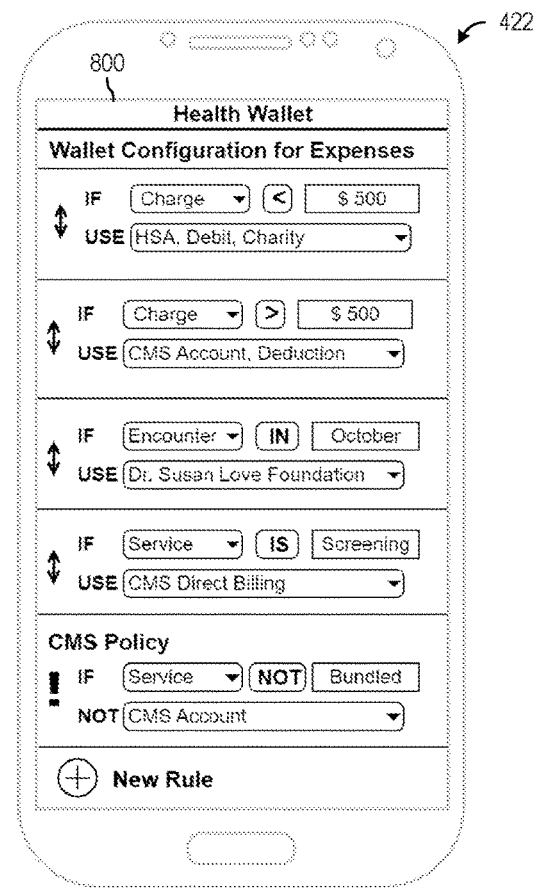
Figure 9:
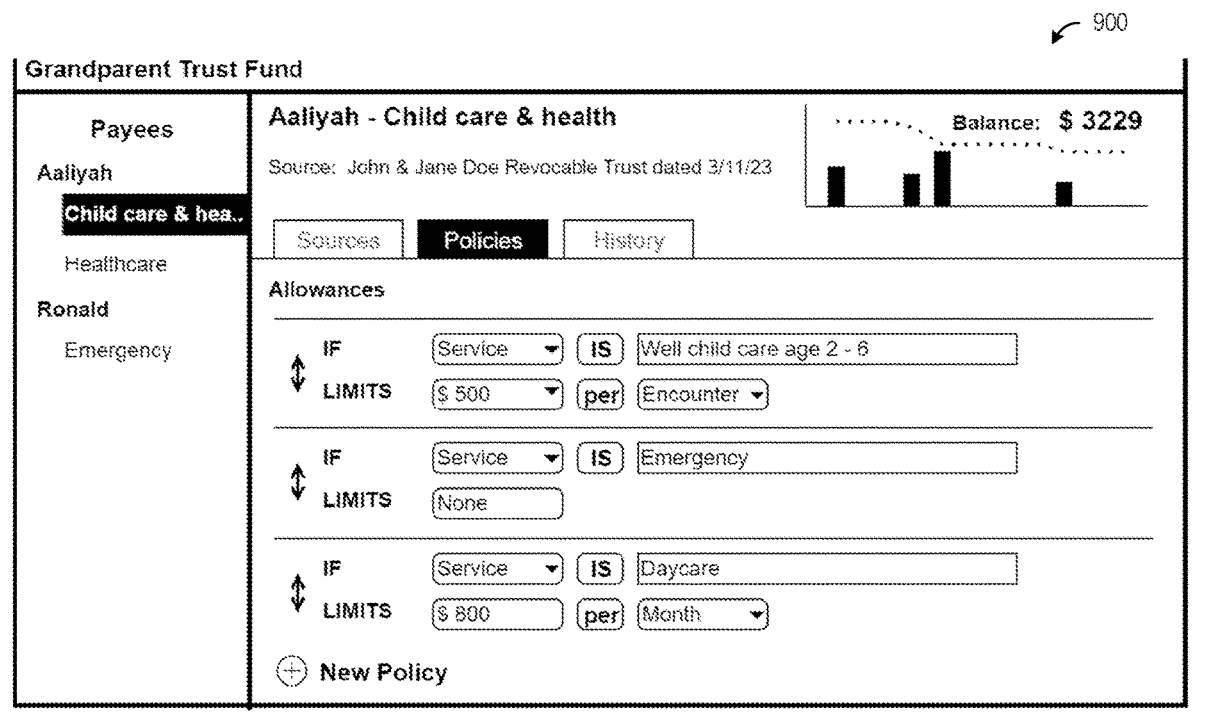

In some implementations, procurement and/or disbursement rules are received via user input. For example, certain rules may be user-defined; accordingly, the user may enter the rules via a user interface (e.g., as shown in FIGS. 8 and 9). In some implementations, procurement and/or disbursement rules are retrieved from a database. For example, procurement and/or disbursement rules may be stored in a database after creating a digital wallet account and later retrieved for use. In some implementations, procurement and/or disbursement rules are retrieved or received from external sources. For example, certain fund sources may define their own procurement and/or disbursement rules. Thus, during or after connecting a fund source to the digital wallet account, the fund source may transmit a set of procurement and/or disbursement rules.

Optionally, at step 508, funds are transferred from one or more fund sources (e.g., fund sources 104) to a holding account (e.g., holding account 202). In particular, procurement manager 112 may facilitate the electronic transfer of funds from one or more of fund sources 104 to holding account 202, e.g., based on the procurement rules obtained at step 506. As mentioned above, the holding account may be a locally maintained account or an externally maintained account that is configured to temporarily hold funds for disbursement. In some implementations, funds from only a portion of connected fund sources may be stored in a holding account. For example, funds from a bank account and/or withholdings from a paycheck may be transferred to and held in a holding account, whereas funds from an HSA or credit card may be retained by the associated entity.

Optionally, at step 510, all or a subset of the funds maintained in the holding account are automatically invested. In particular, investment manager 122 can invest holding account funds into various investment vehicles provided through an external entity (e.g., one of external system(s) 108), such as an external brokerage account. In some implementations, funds can be automatically invested based on procurement/disbursement rules and/or other user preferences. For example, funds may be automatically invested once a holding account value exceeds a threshold. Likewise, investments may be automatically sold and transferred back to the holding account, e.g., if the holding account falls below a threshold value.

Healthcare Expense Payments

Figure 6:
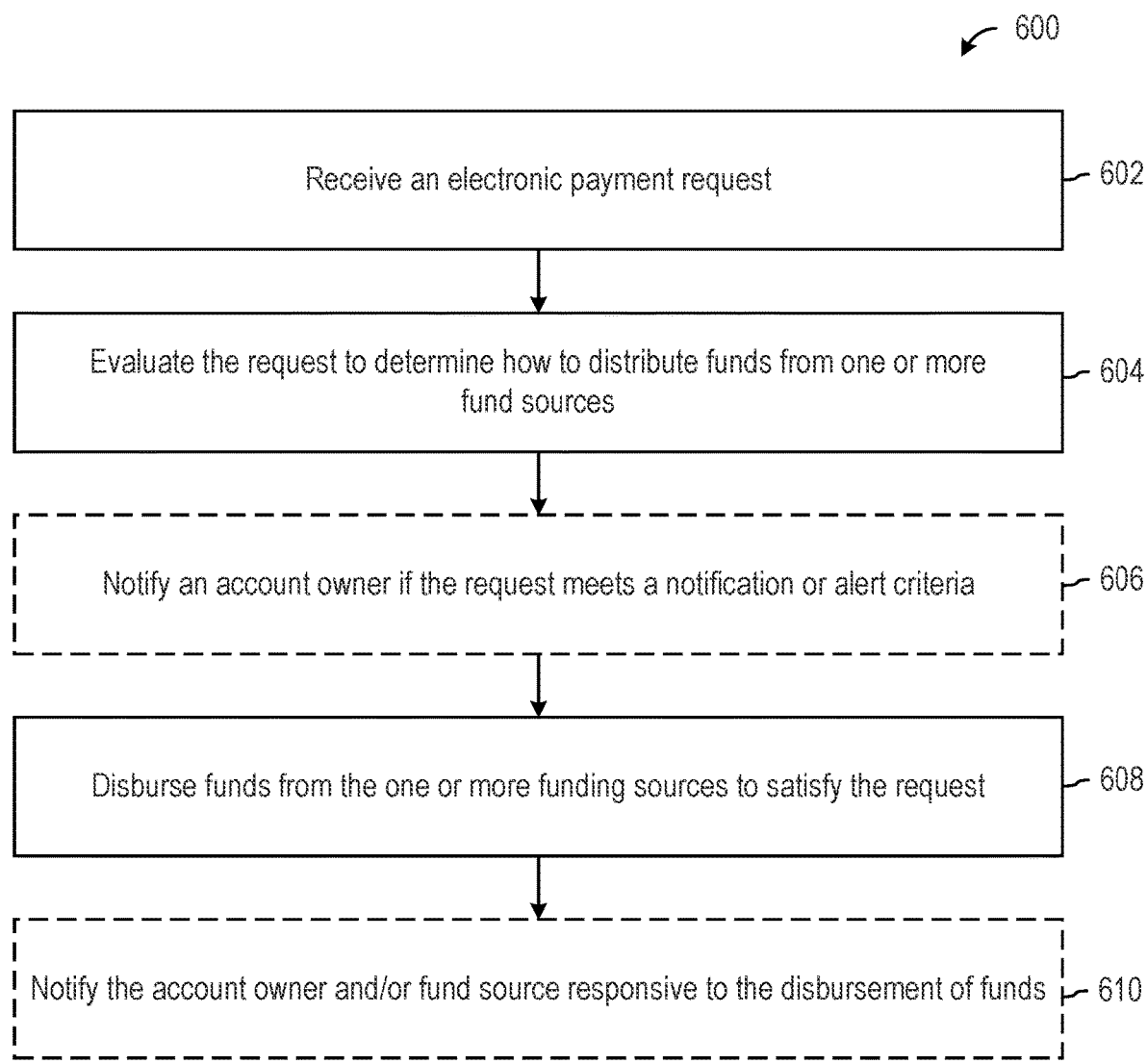
FIG. 6 is a flow diagram of a process for disbursing funds to satisfy a payment request, according to some implementations.

Referring now to FIG. 6, a flow diagram of a process 600 for disbursing funds to satisfy a payment request is shown, according to some implementations. In some implementations, process 600 is implemented by digital wallet management system 400, as described above. It will be appreciated that certain steps of process 600 may be optional and, in some implementations, process 600 may be implemented using less than all of the steps. It will also be appreciated that the order of steps shown in FIG. 6 is not intended to be limiting.

At step 602, an electronic payment request is received, e.g., by digital wallet system 110. As described above, an electronic payment request is any electronically received request for payment of goods and/or services. In some implementations, the electronic payment request is a digital bill that identifies one or more items (e.g., line items for goods or services) for which payment is requested. In some implementations, the payment request is an electronic healthcare claim. In some such implementations, the electronic healthcare claim can include one or more procedure codes or other codes (e.g., Current Procedural Terminology (CPT)/Healthcare Common Procedure Coding System (HCPCS) codes) that identify expenses related to a visit with a healthcare provider. In some implementations, the payment request is a request for reimbursement, e.g., of out-of-pocket expenses. Accordingly, the electronic payment request may be received from a user device associated with the owner or an authorized user of a digital wallet account or from a third party.

At step 604, the electronic payment request is evaluated to determine how best to disburse funds from one or more fund sources to satisfy the request. In some implementations, relevant data is first extracted from the electronic payment requests for evaluation, e.g., using a NLP and/or by parsing the electronic payment request. Relevant data points may include, for example, a type, identifier, and value of each line item or expense in the request. In some implementations, additional data can be extracted such as identifying information for the requestor, recipient, and/or person associated with the electronic payment request. In some implementations, a "type" of electronic payment request (e.g., electronic healthcare claim, reimbursement, etc.) can first be identified, which can inform how to extract data and/or the data that should be extracted. The extracted data, and/or the electronic payment request itself, are then evaluated against disbursement rules to determine whether parameters (e.g., a condition) of any rules are met. Additionally, or alternatively, an AI model is used to evaluate the electronic payment request data.

Generally, the evaluation at step 604 is performed in order to determine which of one or more sources funds should be apportioned from for disbursement, e.g., to satisfy the electronic payment request, based on user-defined rules, fund-source-defined rules, and/or third-party-defined rules. This can include first determining which of the one or more sources are eligible for satisfying the electronic payment request and then, of the fund sources that are eligible, determining a priority or order of how funds should be apportioned and/or an amount of funds that can be apportioned from each of the sources. For example, of three connected fund sources, it may be determined that only two are eligible for satisfying a payment request based on a set of disbursement rules, and that, of the two eligible sources, one source has a fund limit of $500. In some implementations, the evaluation of the electronic payment request can further include identifying qualifying medical expenses, as described above.

At step 606, an account owner is optionally notified if a notification criteria is met. Generally, any number of notification criteria can be established, e.g., by a user, by a fund source, or by another third party. For example, a user may set a notification rule which dictates that a notification is transmitted for any transaction over a set amount. Thus, if the payment request or a status of a holding account or fund sources meets notification criteria, a notification may be generated and transmitted, e.g., to a user device associated with an account owner. In some implementations, the notification prompts a user to take an action. For example, the notification may prompt the user to approve or deny a payment request. As another example, a user may be notified if a balance of a holding account falls below a limit; in which case, the user may be prompted to add additional funds.

At step 608, funds are disbursed to satisfy the electronic payment request. In particular, funds can be electronically transferred from a holding account and/or individual fund sources to a recipient (e.g., requesting device 106), e.g., based on the disbursement determined at step 604. For example, funds may be transferred from a single holding account to a recipient to satisfy the payment; however, the transferred funds may be debited against the balance of funds from multiple different fund sources maintained by the holding account. Additionally, or alternatively, funds may be transferred from individual fund sources to a recipient.

At step 610, the primary account owner and/or the fund source(s) associated with the disbursed funds are optionally notified of the disbursement. In particular, the primary account owner and/or fund source(s) may be sent a notification that provides an indication of the disbursement, including an amount of disbursed funds, the fund source(s) from which the funds were procured, a recipient of the funds, and other relevant details. In some implementations, the notification is transmitted to a user device (e.g., the primary account owner's phone) in the form of a text message, a push notification, an automated phone call, an email, or the like. For example, the primary account owner of a digital wallet may receive a text message on their smartphone informing them of a disbursement and providing associated details, e.g., such that the primary account owner can monitor how funds are being disbursed. In some implementations, the primary account owner, secondary authorized account users, and/or fund sources can dictate rules for disbursement notification. For example, the primary account owner may decide whether or not to receive notifications, can set a disbursement amount that triggers a notification, etc.

User Experience

Figure 7:
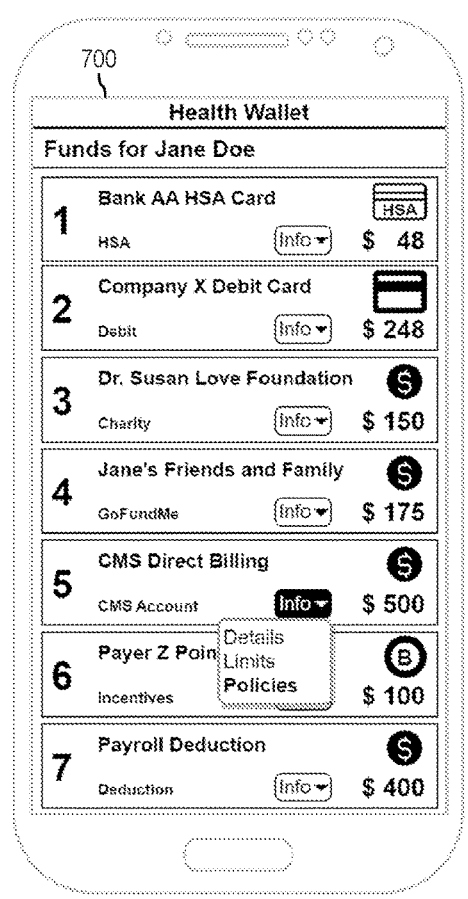

Referring now to FIG. 7, an example user interface 700 for viewing fund sources (e.g., fund sources 104) connected to digital wallet system 110 is shown, according to some implementations. Specifically, user interface 700 includes a listing of fund sources that are connected to a digital wallet account and a number of interactive graphical elements for viewing additional information related to each fund source. In some implementations, each fund source is represented via a graphical element (e.g., a box) that indicates a name or identifier for the fund source, a type of fund source (e.g., HSA, debit card, etc.), an amount of funds available for disbursement, and a selectable icon for viewing details, limits, policies, and other information relating to the fund source. However, it should be appreciated that user interface 700 may include additional information relating to each fund source in other implementations. As shown, user interface 700 may be presented via user device 422 (e.g., a smartphone).

In this example, user interface 700 shows a digital wallet account for a user "Jane Doe," who has seven connected fund sources. Each fund source includes a name, which may be set by the fund source itself or which may be customized by a user. The first fund source, for example, is listed as "Bank AA HSA Card," and is identified as an HSA card via text and an icon. In addition, user interface 700 shows that "Bank AA HSA Card" has $48 in funds available. It should be understood that this fund amount does not necessarily reflect the balance of the fund source itself; rather, the amount of available funds generally indicates the funds that are available to be applied to payments through digital wallet system 110. As mentioned above, user interface 700 further includes a selectable icon for each fund source that, when selected by a user, causes a menu (e.g., a drop-down menu) to be presented that allows the user to view additional details, limits, policies, and other information relating to the fund source. For example, a user may select the "Info" icon and then may select "Limits" from the drop-down menu in order to view preset spending limits for the associated fund source. In some implementations, the user may select a fund source (e.g., by tapping on the fund source as displayed in user interface 700) to be navigated to another interface for viewing detailed rules or, if allowed, modifying rules associated with the fund source, making payments from the fund source, etc.

Referring now to FIG. 8, an example user interface 800 for creating disbursement rules is shown, according to some implementations. Generally, user interface 800 can be used to view rules, add rules, remove rules, or modify existing user-defined rules. For example, a user can select a "New Rule" icon, shown at the bottom of user interface 800, to create a new disbursement rule. In addition, the user can modify or delete existing rules. In some implementations, users can also establish a priority for payments via user interface 800. For example, the order of accounts/account types shown in user interface 800 may indicate a priority for which fund sources to use first, second, etc., when satisfying a payment request. In this example, each rule is in the form of a conditional statement (e.g., "IF-THEN); however, other rule formats are contemplated herein. The first rule shown in user interface 800, for example, dictates that if a charge is less than $500, an HSA, debit, and charity source should be used. In other words, "if a received payment request is less than $500, then satisfy the payment request using the connected HSA, debit, and charity accounts." As another example, the last rule shown in user interface 800 dictates that non-bundle services should not be paid for using funds from a Centers for Medicare & Medicaid Services (CMS) account. It should therefore be appreciated that, as described herein, digital wallet system 110 can consider any number of different user-defined disbursement rules and is not limited only to rules related to fund limits. As shown, user interface 800 may be presented via user device 422 (e.g., a smartphone).

Referring now to FIG. 9, another example user interface 900 for creating disbursement rules is shown, according to some implementations. Like user interface 800, user interface 900 can generally be used to add rules, remove rules, or modify existing user-defined rules. However, unlike user interface 800, user interface 900 is generally configured to be used by a secondary authorized account user—or, more generally, any entity other than the primary account owner— to establish disbursement rules associated with a particular connecting fund source. In this example, the fund source is a trust fund that has been provided by grandparents to assist with medical expenses for their grandchild. As shown, on the left-hand side of user interface 900 is a navigation menu from which a user (e.g., the grandparents) can select different rule sets for one or more payees, e.g., for modification.

In this example, user interface 900 is shown to include balance information for the fund source and a number of tabs that can be selected to view/modify information relating to the fund source. For example, a user could select a "Sources" tab to view other external sources that are used to fund the account or a "History" tab to view past electronic fund transfers from/to the selected account or view how the funds were used to a degree allowed without compromising any HIPAA or related regulations (such as totals only but not institutions). In addition, the user can set rules for the fund source that dictate how the funds can be used (e.g., disbursed). For example, the owners of the trust fund shown in FIG. 9 have set a number of different allowance or limit rules that dictate the amount of funds that can be used (e.g., procured and/or disbursed) from the account for various types of expenses (e.g., $800/month for daycare, $500/month for a "well-child" visit, etc.)

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. A system comprising:
   one or more processors; and
   one or more memories storing processor-executable instructions that, when executed by the one or more processors, cause the one or more processors to perform operations comprising:
   establishing a connection between a plurality of external fund sources and a digital wallet account to facilitate electronic fund transfers from each of the plurality of external fund sources, wherein the plurality of external fund sources includes: i) at least one external fund source that is directly associated with a primary owner of the digital wallet account, and ii) at least one external fund source that is associated with an entity other than the primary owner of the digital wallet account;
   presenting, via a graphical user interface, a plurality of interactive graphical elements, including at least one interactive graphical element associated with the at least one external fund source that is directly associated with the primary owner of the digital wallet account, and at least one interactive graphical element associated with the at least one external fund source that is associated with the entity other than the primary owner of the digital wallet account;
   receiving, via the graphical user interface, selections of one or more of the plurality of interactive graphical elements;
   generating, based on the selections of one or more of the plurality of interactive graphical elements via the graphical user interface, a first set of rules that dictate how funds are disbursed from funds of the plurality of external fund sources to satisfy electronic payment requests, wherein the first set of rules includes: i) at least one rule defined by the primary owner of the digital wallet account, and ii) at least one rule defined by each of the plurality of external fund sources;
   receiving a first electronic payment request;
   identifying at least one of the plurality of external fund sources from which to source first funds to satisfy the first electronic payment request by evaluating the first electronic payment request with respect to the first set of rules; and
   disbursing the first funds from the identified at least one of the plurality of external fund sources to satisfy the first electronic payment request.

2. The system of claim 1, wherein the first electronic payment request includes one or more medical expenses, and wherein identifying at least one of the plurality of external fund sources from which to source the first funds to satisfy the first electronic payment request includes determining whether any of the one or more medical expenses are non-qualifying medical expenses for any of the plurality of external fund sources.

3. The system of claim 1, wherein the processor-executable instructions, when executed by the one or more processors, further cause the one or more processors to perform operations comprising:
   procuring second funds from the plurality of external fund sources; and
   maintaining the procured second funds in a holding account associated with the digital wallet account.

4. The system of claim 3, wherein the processor-executable instructions, when executed by the one or more processors, further cause the one or more processors to perform operations comprising:
   obtaining a second set of rules that dictate the procurement of the second funds from the plurality of external fund sources, wherein the second funds are procured from the plurality of external fund sources based on the second set of rules.

5. The system of claim 3, wherein the processor-executable instructions, when executed by the one or more processors, further cause the one or more processors to perform operations comprising:

automatically investing at least a portion of the second funds maintained in the holding account through one or more internal or external investment vehicles.

6. The system of claim 3, wherein the digital wallet account is associated with a plurality of secondary authorized users in addition to the primary owner, wherein each of the plurality of secondary authorized users is permitted to access the holding account.

7. The system of claim 1, wherein the first electronic payment request is a reimbursement request submitted by the primary owner of the digital wallet account or a secondary authorized account user.

8. The system of claim 1, wherein the entity other than the primary owner and the plurality of external fund sources that defines at least one of the first set of rules is a healthcare insurance provider.

9. The system of claim 1, wherein the processor-executable instructions, when executed by the one or more processors, further cause the one or more processors to perform operations comprising:

generating a notification if the first electronic payment request meets a notification criteria based on the first set of rules; and presenting the notification to a user via a user interface.

10. The system of claim 1, wherein the processor-executable instructions, when executed by the one or more processors, further cause the one or more processors to perform operations comprising:

receiving an input comprising user credentials for accessing the digital wallet account;

verifying the user credentials; and permitting access to the digital wallet account if the user credentials are verified to facilitate at least one of: i) adding a new external fund source, ii) removing one of the plurality of external fund sources, or iii) modifying the first set of rules.

11. The system of claim 1, wherein the first electronic payment request is evaluated with respect to the first set of rules using an artificial intelligence (AI) model, wherein the AI model is trained based on the first set of rules.

12. A computer-implemented method comprising:

establishing, by one or more processors, a connection between a plurality of external fund sources and a digital wallet account to facilitate electronic fund transfers from each of the plurality of external fund sources, wherein the plurality of external fund sources includes: i) at least one external fund source that is directly associated with a primary owner of the digital wallet account, and ii) at least one external fund source that is associated with an entity other than the primary owner of the digital wallet account;

presenting, by the one or more processors, via a graphical user interface, a plurality of interactive graphical elements, including at least one interactive graphical element associated with the at least one external fund source that is directly associated with the primary owner of the digital wallet account, and at least one interactive graphical element associated with the at least one external fund source that is associated with the entity other than the primary owner of the digital wallet account;

receiving, by the one or more processors, via the graphical user interface, selections of one or more of the plurality of interactive graphical elements;

generating, by the one or more processors, based on the selections of one or more of the plurality of interactive graphical elements via the graphical user interface, a first set of rules that dictate how funds are disbursed from funds of the plurality of external fund sources to satisfy electronic payment requests, wherein the first set of rules includes: i) at least one rule defined by the primary owner of the digital wallet account, and ii) at least one rule defined by each of the plurality of external fund sources;

receiving, by the one or more processors, a first electronic payment request;

identifying, by the one or more processors, at least one of the plurality of external fund sources from which to source first funds to satisfy the first electronic payment request by evaluating the first electronic payment request with respect to the first set of rules; and disbursing, by the one or more processors, the first funds from the identified at least one of the plurality of external fund sources to satisfy the first electronic payment request.

13. The computer-implemented method of claim 12, wherein the first electronic payment request includes one or more medical expenses, and wherein identifying at least one of the plurality of external fund sources from which to source the first funds to satisfy the first electronic payment request includes determining whether any of the one or more medical expenses are non-qualifying medical expenses for any of the plurality of external fund sources.

14. The computer-implemented method of claim 12, further comprising:

procuring, by the one or more processors, second funds from the plurality of external fund sources; and maintaining, by the one or more processors, the procured second funds in a holding account associated with the digital wallet account.

15. The computer-implemented method of claim 14, further comprising:

obtaining, by the one or more processors, a second set of rules that dictate the procurement of the second funds from the plurality of external fund sources, wherein the second funds are procured from the plurality of external fund sources based on the second set of rules.

16. The computer-implemented method of claim 14, further comprising:

automatically investing, by the one or more processors, at least a portion of the second funds maintained in the holding account through one or more internal or external investment vehicles.

17. The computer-implemented method of claim 12, wherein the first electronic payment request is a reimbursement request submitted by the primary owner of the digital wallet account or a secondary authorized account user.

18. The computer-implemented method of claim 12, further comprising:

generating, by the one or more processors, a notification if the first electronic payment request meets a notification criteria based on the first set of rules; and presenting, by the one or more processors, the notification to a user via a user interface.

19. The computer-implemented method of claim 12, further comprising:

receiving, by the one or more processors, an input comprising user credentials for accessing the digital wallet account;

verifying, by the one or more processors, the user credentials; and permitting access to the digital wallet account, by the one or more processors, if the user credentials are verified to facilitate at least one of: i) adding a new external fund source, ii) removing one of the plurality of external fund sources, or iii) modifying the first set of rules.

20. One or more non-transitory computer readable media storing processor-executable instructions that, when executed by one or more processors, cause the one or more processors to perform operations comprising:

establishing a connection between a plurality of external fund sources and a digital wallet account to facilitate electronic fund transfers from each of the plurality of external fund sources, wherein the plurality of external fund sources includes: i) at least one external fund source that is directly associated with a primary owner of the digital wallet account, and ii) at least one external fund source that is associated with an entity other than the primary owner of the digital wallet account;

presenting, via a graphical user interface, a plurality of interactive graphical elements, including at least one interactive graphical element associated with the at least one external fund source that is directly associated with the primary owner of the digital wallet account, and at least one interactive graphical element associated with the at least one external fund source that is associated with the entity other than the primary owner of the digital wallet account;

receiving, via the graphical user interface, selections of one or more of the plurality of interactive graphical elements;

generating, based on the selections of one or more of the plurality of interactive graphical elements via the graphical user interface, a first set of rules that dictate how funds are disbursed from funds of the plurality of external fund sources funds to satisfy electronic payment requests, wherein the first set of rules includes: i) at least one rule defined by the primary owner of the digital wallet account, and ii) at least one rule defined by each of the plurality of external fund sources;

receiving a first electronic payment request;

identifying at least one of the plurality of external fund sources from which to source first funds to satisfy the first electronic payment request by evaluating the first electronic payment request with respect to the first set of rules; and disbursing the first funds from the identified at least one of the plurality of external fund sources to satisfy the first electronic payment request.

\* \* \* \* \*